United States Patent
Hösl et al.

(10) Patent No.: US 12,221,284 B2
(45) Date of Patent: Feb. 11, 2025

(54) CONVEYING SYSTEM

(71) Applicant: Kinemation AG, Flaach (CH)

(72) Inventors: Tobias Hösl, Lauchringen (DE); Tolga Seringen, Niederhasli (CH)

(73) Assignee: KINEMATION AG (CH)

(*) Notice: Subject to any disclaimer, the term of this patent is extended or adjusted under 35 U.S.C. 154(b) by 94 days.

(21) Appl. No.: 18/021,455

(22) PCT Filed: Aug. 18, 2021

(86) PCT No.: PCT/EP2021/072905
§ 371 (c)(1),
(2) Date: Feb. 15, 2023

(87) PCT Pub. No.: WO2022/038174
PCT Pub. Date: Feb. 24, 2022

(65) Prior Publication Data
US 2023/0339689 A1   Oct. 26, 2023

(30) Foreign Application Priority Data
Aug. 20, 2020   (CH) .................................... 01040/20

(51) Int. Cl.
*B65G 17/12*   (2006.01)
*B65G 35/06*   (2006.01)
*B65G 54/02*   (2006.01)

(52) U.S. Cl.
CPC .................................... *B65G 17/12* (2013.01)

(58) Field of Classification Search
CPC ...... B65G 17/12; B65G 35/06; B65G 54/025; B65G 17/32; B65G 17/002; B65G 17/005
(Continued)

(56) References Cited

U.S. PATENT DOCUMENTS

| 2013/0126307 A1* | 5/2013 | Stoeckle | B65G 19/225 |
| | | | 198/619 |
| 2015/0122614 A1* | 5/2015 | Dumitrescu | B65G 54/02 |
| | | | 198/570 |

FOREIGN PATENT DOCUMENTS

| CN | 207 361 149 U | 5/2018 |
| DE | 228 790 A1 | 10/1985 |

(Continued)

OTHER PUBLICATIONS

International Search Report issued in PCT Application No. PCT/EP2021/072905, dated Dec. 8, 2021, 3 pgs.

*Primary Examiner* — Gene O Crawford
*Assistant Examiner* — Muhammad Awais
(74) *Attorney, Agent, or Firm* — DILWORTH IP, LLC

(57) ABSTRACT

A conveying system with a conveying line and a number of shuttles. The conveying line includes a number of conveying modules, wherein each conveying module includes a conveying belt, the conveying belt generally extending in parallel with a longitudinal conveying line axis. The conveying belt includes a counter-magnetic member that substantially along the whole circumference of the conveying belt. Each shuttle includes a product interface for operatively coupling with a product to be conveyed and a magnetic member. Each shuttle and each conveying module may be temporarily associated with each other to establish a shuttle conveying module combination. In a shuttle conveying module combination, the magnetic member of the shuttle and the counter-magnetic member of the conveying belt of the conveying module interact by way of ferromagnetic forces, thereby releasably coupling the shuttle to the conveying belt of the conveying module.

24 Claims, 16 Drawing Sheets

(58) Field of Classification Search
USPC .......................................................... 198/793
See application file for complete search history.

(56) References Cited

FOREIGN PATENT DOCUMENTS

| | | | | |
|---|---|---|---|---|
| DE | 4210188 A1 | * | 10/1993 | ......... B65G 21/2009 |
| DE | 4437364 A1 | * | 4/1996 | ........... B23Q 7/1447 |
| EP | 2 594 510 A1 | | 5/2013 | |
| GB | 1350715 A | * | 4/1974 | ............ B60L 13/035 |
| JP | S59 223557 A | | 12/1984 | |
| WO | 2013/169778 A1 | | 11/2013 | |

* cited by examiner

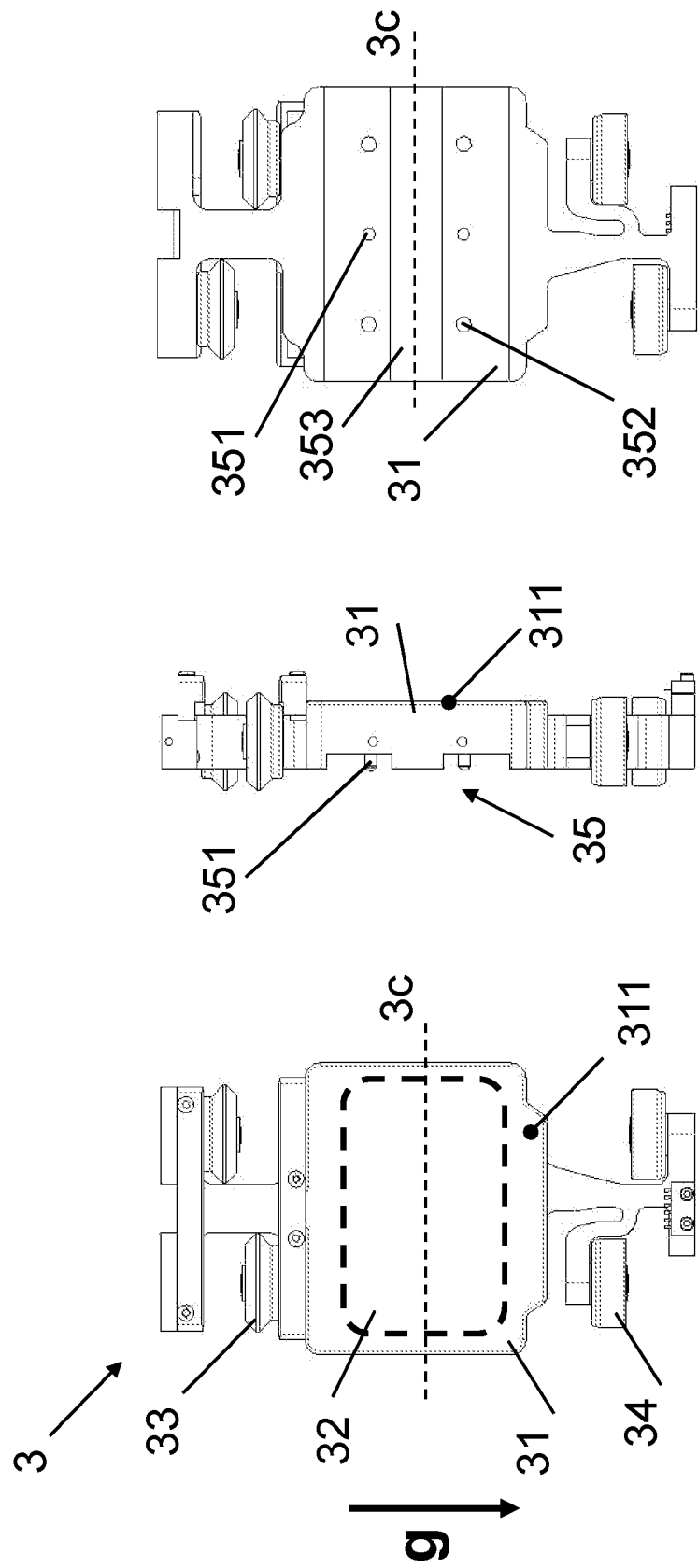

CONVEYING SYSTEM

FIELD OF THE INVENTION

The present invention relates to conveying systems for shuttles and methods for conveying shuttles, as well as to assembly systems that include a conveying system.

BACKGROUND

In the automated or semi-automated assembly or manufacture of products, those products are often carried by shuttles on which they are transported, routed and/or conveyed along various assembly stations of an assembly line, wherein each of the assembly steps may carry out one or more steps of an overall assembly or manufacture process. An assembly station may further execute auxiliary steps, such as measurement and/or inspection steps. In such an assembly system, the shuttle serves as interface between the products to be assembled and the assembly line.

Once a product on its shuttle has passed all assembly stations of the assembly line and is removed from the shuttle, the shuttle needs to be returned to the beginning of the assembly line. In a typical assembly process, a number of shuttles is present that are conveyed along the assembly line and need to be returned back from the end of the assembly line to its beginning in a cyclic and virtually endless manner.

SUMMARY OF THE INVENTION

As far as the returning of shuttles is concerned, it is generally desired to do this in a both reliable and cost-efficient manner. In particular, if the assembly line is arranged in a clean room environment, as it is the case, e.g. for products such as balloon catheters, infusion tubing and many other medical devices, the consumed floor space is an issue of particular importance and general concern, since clean room floor space is generally limited and highly expensive.

Further, a high degree of flexibility is generally desired in order to allow the application in different and changing scenarios and assembly system configurations with minimum modifications.

It is an overall objective of the present disclosure to improve the state of the art regarding conveying systems and the conveying of shuttles, in particular in the context of assembly systems and product assembly, in particular but not limited to the field of medical devices. Favorably, one or more problems or drawbacks of known systems are overcome fully or partly.

In a general manner, the overall objective is achieved by the subject of the independent claims. Exemplary and/or particularly favorable embodiments are further defined by the dependent claims as well as the overall disclosure.

In an aspect, a conveying system is provided. The conveying system may particularly be suited for use in an assembly and or manufacture system. However, it is not limited to this field of application. The conveying system includes a conveying line and a number of shuttles.

The conveying line has a first conveying line end and an opposed second conveying line end and a longitudinal conveying line axis extending between the first conveying line end and the second conveying line end. The conveying line includes a number of conveying modules. Each conveying module includes a circumferentially closed conveying belt. The conveying belt of a conveying module generally extends in parallel with the conveying line axis. The conveying belt includes a counter-magnetic member, the counter-magnetic member extending substantially along the whole circumference of the conveying belt. Each conveying module further includes a drive in operative coupling with the conveying belt to drive the conveying belt with a circumferential speed. In an alternative embodiment, a common drive may be provided in operative coupling with a number of conveying belts for commonly driving this number of conveying belts.

Each shuttle includes a product interface for operatively coupling with a product to be conveyed. Each shuttle further includes a magnetic member. The magnetic member is arranged to interact with the counter-magnetic member to releasably couple a shuttle to a conveying belt by way of ferromagnetic forces.

Each of the shuttles and each of the conveying modules may be temporarily associated with each other to establish a shuttle conveying module combination. In a shuttle conveying module combination, the magnetic member of the shuttle and the counter-magnetic member of the conveying belt of the conveying module interact by way of ferromagnetic forces, thereby releasably coupling the shuttle to the conveying belt. In particular, the counter-magnetic member of the conveying belt may attract the magnetic member of the shuttle.

Regarding the number of conveying modules, any desired number of conveying modules may be present. In some embodiments, the number of conveying modules is one, i.e. only a single conveying module is present. In typical embodiments, however, more than one conveying module is present, such as for example, 2, 3, 5, 7, or 10 conveying modules. In principle, the number of possible conveying modules is unlimited and is selected in accordance with the needs of a specific application. While other arrangements may be used, all or at least a group of conveying modules have typically the same length respective the extension along the conveying line axis. Further, the conveying modules may be of generally identical design. If a first and/or a second shiftable end conveying module is present as explained further below in more detail, such shiftable end conveying modules may be of somewhat different design and may in particular have a shorter length. Generally, the arrangement of conveying modules is fixed and the conveying modules are arranged in a fixed manner for a given conveying system.

The number of shuttles may be one in some examples, but more than one shuttle is typically present. In the context of an assembly system as discussed further below, the number of shuttles generally depends on the number of products to be assembled and/or the operational speed and cycle time of the assembly station, and/or on the number of assembly stations.

As will become more apparent as the description proceeds, one and the same shuttle can generally be transferred between neighboring conveying modules. While a shuttle is generally associated with a single conveying module at the same time, a shuttle may also be associated with two neighboring conveying modules and accordingly belong to two shuttle conveying module combinations simultaneously, respectively at the same time, while being transferred between neighboring conveying modules. Further, more than one shuttle may simultaneously, respectively at the same time, couple to the conveying belt of one and the same conveying module, such that one and the same conveying module is simultaneously, respectively at the same point in time, associated with more than one shuttle and accordingly forms part of more than one shuttle conveying module combination. In dependence of the dimensions of the shuttles and the length of a conveying belt, in principle any number of shuttles may simultaneously be coupled to the conveying belt of one and the same conveying module.

In order to support the conveying belt, each conveying module generally includes at least a first and a second pulley that are displaced respectively offset with respect to each other in a direction parallel to the longitudinal conveying line axis. The longitudinal axis of an individual conveying module is referred to as longitudinal conveying module axis and may in particular coincide or be parallel offset with respect to the conveying line axis as discussed further below. Further, the longitudinal conveying module axis of all or a part of the conveying modules may coincide.

The conveying belt is routed around the pulleys in a circumferentially closed manner. The conveying belt extends between and around the pulleys substantially without slackness or slipping. The conveying belts are arranged such that an area along the longitudinal conveying line axis between the first and second pulley is non-curved, resulting in a planar respectively non-curved shuttle contact surface that is given by the distance of the first and second pulley and the conveying belt width. The shuttle contact surfaces of all conveying belts favorably extend in a common shuttle contact plane. In a typical design, the conveying belt width may, for example be 16 mm. Further, the shuttle contact surface is favorably substantially unstructured.

The linear movement direction of the conveying belt surface, corresponding to the direction in which a coupled, respectively associated shuttle, of a shuttle conveying belt combination moves, is referred to as conveying direction and may be aligned with, respectively be parallel, to, the conveying line axis from the first conveying line end towards the second conveying line end, or from the second conveying line end toward the first conveying line end. The ends of a specific conveying module along the longitudinal conveying line axis are referred to as first conveying module end (pointing towards the first conveying line end) and second conveying module end (pointing towards the second conveying line end), respectively, and the distance between the first conveying module end and second conveying module end is referred to as conveying module length.

Typically, one of the first and second pulleys is coupled to a drive that is for example realized by an electric motor. One or more auxiliary pulleys may optionally be arranged between the first and second pulley along the conveying module length. Favorably, the conveying belt is a toothed belt and the at least one of the first and second pulleys, in particular the pulley that is coupled to the drive, has a corresponding circumferential engagement structure to engage with the teeth of the conveying belt. Here and in the following, the side of the toothed belt that comes into contact with the pulleys is referred to as inner side while the opposite side is referred to as outer side. Typically, only the inner side of the conveying belts is toothed while the outer side (i.e. the side that contacts a shuttle) is unstructured respectively flat. Further, the conveying belt and one or both of the first and second pulleys may have centering features as discussed in more detail in the context of exemplary embodiments.

The conveying module and in particular its drive is further designed to operatively couple with an electronic control unit for controlling and favorably monitoring/supervising operations of the conveying module. The control unit may be a common control unit of the conveying line and may in some embodiments further be designed to control other operations, such as operation of an assembly line and/or the shifting of shiftable conveying modules as explained further below.

The product interface of each shuttle may be directly designed to releasably couple, respectively engage with a product to be assembled. Alternatively, the product interface of a shuttle is not designed to directly couple to, respectively engage with a product, but to directly couple to, respectively engage with a favorably exchangeable product holder and the product holder serves as intermediate element between the shuttle and a product. This type of embodiment has the advantage that the shuttles as such do not need to be particularly adopted for a special type of product, but may be generic and couple with different types of product holders for the assembly of different products.

The magnetic member of a shuttle is typically realized as permanent magnet and is arranged such that a good magnetic coupling with a temporarily associated conveying belt and preferably an additional attraction bar as explained below is enabled. For coupling with a conveying belt, each shuttle comprises a conveying belt interface. While the magnetic coupling provides the required holding force of a shuttle transverse to the transport direction, the sticking friction force between shuttle and conveying belt ensures the conveying of the shuttle in accordance with the movement of the conveying belt. Apart from the magnetic member, a shuttle is favorably made from a non-magnetic and non-magnetizable (i.e. magnetic passive) material, such as aluminum or plastics.

The counter-magnetic member of a conveying belt is in contrast to the magnetic member in some embodiments not realized as a permanent magnet but made from a per se non-magnetic but magnetizable material, in particular steel, as discussed further below in the context of specific embodiments. In such embodiments where the counter-magnetic member is not permanently magnetic, it is also referred to as magnetizable member. In further embodiments, the counter-magnetic member is realized as permanent magnet and arranged such that the magnetic member and the counter-magnetic member attract each other.

In an embodiment, each shuttle includes a generally planar conveying belt contact surface, wherein the magnetic member is arranged at or in proximity of the conveying belt contact surface of the respective shuttle. In such embodiment, the conveying belt contact surface provides the conveying belt interface as mentioned before. Typically, the shuttle has a plate-shaped shuttle body with e.g. rectangular or quadratic footprint. In operation, one side of the shuttle body points towards the convening belt or conveying belts and provides the conveying belt interface respectively conveying belt contact surface. The conveying belt contact surface lies in the shuttle contact plane as explained before to contact the conveying belt of a temporarily associated conveying module in the shuttle contact plane. The opposite side of the shuttle body (pointing away from the conveying belts) provides the product interface, respectively product holder interface. Since the shuttle body is generally non-magnetic, the magnetic member may be arranged within the shuttle body with the magnetic field extending through the shuttle body in a substantially undisturbed manner.

In an embodiment, each conveying module includes a prismatic guide rail. The prismatic guide rail extends parallel to the longitudinal conveying line axis and in parallel with the conveying belt of the respective conveying module and has a length that generally corresponds to the conveying module length, with the ends of the prismatic guide rail corresponding to the first and second conveying module ends. In such embodiment, each shuttle further includes a number of guide pulleys. The guide pulleys of a shuttle are arranged to engage, in a shuttle conveying module combination, with the prismatic guide rail of the respective conveying module. In a shuttle conveying module combination, the prismatic guide rail guides the shuttle along, respectively parallel to, the longitudinal conveying line axis. The guide pulleys are rotatable. By the engagement of the prismatic guide rail and the guide pulleys, it is ensured that the shuttles follow a well-defined and straight path without tilting. For a typical embodiment where the conveying belt width extends vertically, the prismatic guide rail may be arranged above or below the conveying belt. In a favorable variant, the prismatic guide rail includes at least two prismatic grooves that extend parallel to each other and the conveying belt, while at least two guide pulleys are arranged with a corresponding offset with respect to each other in a direction transverse to the conveying direction respectively the conveying line axis such that each of the guide pulleys is associated with one of the prismatic grooves and engages with this groove. Instead of a prismatic guide rail with two prismatic grooves, two separate guide rails with a single guide groove each could in principle be used. In the direction of the conveying line axis, the some or all guide pulleys are favorably also offset, respectively spaced apart from each other. Such an arrangement improves the stability and is particularly advantageous in the context of a shuttle being transferred between neighboring conveying modules as explained further bellow.

In an embodiment, each conveying module includes a magnetizable attraction bar. The magnetizable attraction bar extends parallel to the longitudinal conveying line axis and in parallel with the conveying belt of the respective conveying module. The attraction bar has a length that generally corresponds to the conveying module length. The magnetizable attraction bar of each conveying module is further arranged such that, in a shuttle conveying module combination, the magnetic member of the shuttle is attracted by the magnetizable attraction bar of the conveying module by way of ferromagnetic forces.

The attraction bar serves the purpose of providing an additional attraction force for a shuttle in the direction towards the conveying belt, thereby improving the coupling between shuttle and conveying belt. However, in contrast to the conveying belt, the attraction bar is favorably arranged such that it does not physically contact the shuttle, respectively its conveying belt interface, but an air gap remains between them. Otherwise, the attraction between the magnetic member and the attraction bar might result in the shuttle being locked in position without being conveyed via the conveying belt. In a typical implementation, the air gap may be in a range of about 2 mm.

The interaction between the shuttle and the attraction bar favorably occurs in the area of the conveying belt coupling interface, respectively conveying belt contact surface. The magnetic member of a shuttle is favorably sufficiently large and arranged to enable coupling with respectively attraction by both the conveying belt and the attraction bar of a temporarily associated conveying module. In a typical embodiment, the magnetizable attraction bar is made from steel. In a typical embodiment, with a prismatic guide rail as explained before, the prismatic guide rail and the magnetizable attraction bar may be arranged and extend on the same side of the conveying belt, with the magnetizable attraction bar extending between the conveying belt and the prismatic guide rail. In alternative embodiments, the magnetizable attraction bar and the prismatic guide rails are arranged and extend on opposite sides of the conveying belt along the conveying line axis. In some embodiments, a number of more than one attraction bar, e.g. two attraction bars, may be present per conveying module and extend parallel to each other.

In an embodiment, each conveying module includes a support member. The support member extends parallel to the longitudinal conveying line axis and in parallel to the conveying belt. The length of the support member generally corresponds to the length of the conveying module. In such embodiment, each shuttle includes a number of pivotable respectively rotatable support pulleys. The support pulleys are arranged to contact, in a shuttle conveying module combination, a support surface of the support member and roll on the support member. The contact of the support pulleys and the support member further supports and stabilizes the shuttle when being conveyed and prevents undesired movements such as tilting or hunting. In contrast to guide pulleys and a prismatic guide rail as explained before, the support surface is generally flat, respectively planar, and the support pulleys have a cylindrical running surface. A contact force between the support pulleys and the support surface is generally transverse to the shuttle contact plane. In embodiments that also include prismatic guide rails and guide pulleys as explained before, the support pulleys and the guide pulleys are favorably arranged on an opposite sides of the shuttle body, with the shuttle body extending between them and the conveying belt of an associated conveying module also extending between the guide pulleys and the support pulleys. The rotation axes of the guide pulleys and the support pulleys are parallel, transverse to the assembly line axis. In the direction of the conveying line axis, support pulleys are favorably also offset, respectively spaced apart, from each other, in an analogue manner as explained before in the context of guide pulleys. Transverse to the longitudinal conveying line axis, the support pulleys may be aligned without offset or may have an axial offset. The support member may, for example, be realized by a solid bar, with a surface of the bar serving as support surface, or may be realized by a profile rail of U-shaped cross section, with an inner or outer surface of one of its legs serving as support surface.

In an embodiment, the conveying system further includes a number of shuttle detectors. Each shuttle detector is arranged at an associated shuttle detector position. Each shuttle detector is configured to detect the presence of a shuttle of the number of shuttles at its associated shuttle detector position. Each shuttle detector is generally arranged at a fixed position along the conveying line axis between the first conveying line end and the second conveying line end.

As shuttle detectors, different types of sensors may be used, such as position switches that are actuated by a passing shuttle and/or light barriers. In a particularly favorable design, shuttle detectors are realized as inductive sensors, reed switches or capacitive sensors that react on the presence of the magnetic member of a shuttle.

In a typical embodiment, more than one shuttle detector is present, by way of example, one shuttle detector is present per conveying module and arranged, e.g., at or in proximity of one if the ends or the middle or end of the conveying belt respectively the conveying module along the conveying line axis. In a further embodiment, two shuttle detectors are present per conveying module and are arranged at or in proximity of the beginning, respectively end, of the conveying belt, respectively the conveying module. The number of shuttle detectors is favorably operatively coupled to the control unit as mentioned before and the control unit is designed to evaluate a signal or signals as provided by the number of shuttle detectors. In some embodiments, a number of, e.g. one or two shuttle detectors is/are integrated into a conveying module and accordingly form/s part of the conveying module. Typically, each conveying module includes at least one shuttle detector.

In an embodiment, the counter-magnetic member of the conveying belt of each conveying module is a steel inlay, the steel inlay being embedded in an elastic base material of the conveying belt of the respective conveying module. In some embodiments, the steel inlay is realized by one or a plurality of steel wires, steel braids or steel cords. In further embodiments, may be a steel meshwork or a steel foil. The base material is generally non-magnetic and may for example be Polyurethane or another flexible respectively elastic material as generally known in the field of conveying belts. Conveying belts, in particular toothed conveying belts, with a steel inlay are commercially available, e.g. from BRECO Antriebstechnik Breher GmbH & Co. KG, Porta Westfalica, Germany or Elatech S.r.l., Val Brembilla, Ital. In this context it is noted, however, that steel inlays are provided and used only for reasons of mechanical strength, but not for magnetic coupling of an object to be conveyed. While using an available conveying belt with a steel inlay as magnetizable member respectively counter-magnetic member is particularly favorable, it is in principle also possible to provide the magnetizable member at the outside or inside of the conveying belt, rather than being embedded between other layers. In further embodiments, the counter-magnetic member may by sandwiched between layers of an elastic material.

In an alternative realization, the counter-magnetic member may be a permanent magnet respectively be made from a permanently magnetic material. In such embodiments, the counter-magnetic member may in particular be realized as a flexible magnetic foil or band that is embedded in an elastic material or sandwiched between layers of an elastic material as explained before.

In an embodiment, the longitudinal conveying line axis is transverse to the direction of gravity, respectively transverse to the vertical direction. In such embodiment, the longitudinal conveying line axis and accordingly the conveying direction are horizontal. In a particular embodiment, the (common) shuttle contact plane is also a vertical plane with the width of the number of conveying belts extending vertically and the pulley axes also being vertical.

In an embodiment, a group of conveying modules of the number of conveying modules are arranged one after the other along the longitudinal conveying line axis and are aligned with each other, thereby forming a core conveying line. The core conveying line extends along the longitudinal axis between a first core conveying line end and a second core conveying line end.

The conveying modules of the core conveying line being aligned means that the conveying belts of neighboring conveying modules have sufficient overlap in a direction of the conveying belt width to allow a shuttle to be transferred between them. Typically, all conveying belts have the same width and the edges of the single conveying belts (in the direction of the width of the conveying belts) are in line.

Further, the distance between the conveying belts of neighboring conveying modules along the longitudinal conveying line axis should be as small and favorably just large enough to prevent them from touching each other. With other words, the second conveying module end of a conveying module generally corresponds to the first conveying module end of a neighboring conveying module of the core conveying line for all, except the outermost conveying modules, along the longitudinal conveying line axis. In a typical design, the gap between neighboring conveying belts at their vertexes is, e.g. in a range of 1 mm to 2 mm.

The drives of the conveying modules of the core conveying line are each configured to drive the corresponding conveying belt in a common direction and with a common circumferential speed. Via such an arrangement, a shuttle may be transferred in a continuous manner between neighboring conveying modules of the core conveying line. The conveying modules of a core conveying line are generally arranged in a fixed and permanent configuration with respect to each other. The total length of a core conveying line along, respectively parallel to, the longitudinal conveying line axis is referred to as core conveying line length. An arrangement of conveying modules that forms a core conveying line may in principle be regarded as a single conveying module, having a length corresponding to the core conveying line length.

The possibility of arranging a group of conveying modules as a core conveying line is a particular advantage of a conveying line and conveying system according to the present disclosure and significantly adds to its flexibility and universal applicability. Conveying modules may be provided with a limited number of lengths or even only with a single length and may be arranged in line to obtain virtually any desired overall length, e.g., to fit an assembly station as explained further below in more detail. In a typical embodiment, the individual conveying modules of the core conveying line have a conveying module length of 0.5 m each. Generally, the resulting overall length of the number of conveying modules of a core conveying line, along the longitudinal conveying line axis, corresponds to the sum of the individual conveying modules' lengths. The longitudinal conveying module axes of the single conveying modules of the core conveying line coincide and further coincide respectively are parallel with the longitudinal convening line axis.

In embodiments where the conveying modules have prismatic guide rails as explained before, adjacent front faces, respectively front ends of neighboring guide rails in the core conveying line, preferably touch each other. Further, the prismatic guide rails are aligned in a similar manner as the conveying belts such that one, respectively two continuous guides, are formed along the longitudinal extension direction.

In embodiments where the conveying modules have attraction bars and/or support members as explained before, adjacent front faces, respectively front ends of neighboring attraction bars, touch each other, respectively support members or may be arranged with a small gap. Via these measures, it is ensured that a shuttle is smoothly transferred between neighboring conveying modules.

In some embodiments, the group of conveying modules of the core conveying line comprises a single conveying module. In typical embodiments, however, the core conveying line comprises a number of more than one conveying modules in accordance with the specific application. Further, all conveying modules of the conveying line may be part of the core conveying line, such that the number of conveying modules of the conveying line corresponds to the group of conveying modules of the core conveying line. In such embodiments, the core conveying line is identical to the conveying line. In typical embodiments that are described further below in more detail, however, the conveying line includes a core conveying line and additionally a first and second shiftable end conveying module, with the core conveying line being arranged between the first and second shiftable end conveying module along the longitudinal conveying line axis.

The drives of all conveying modules of a core conveying line may be activated simultaneously. Alternatively, the drives are actuated in sequence and with some overlap as follows: Only a drive of an active conveying module, where the conveying belt currently couples to and actually conveys a shuttle, is generally activated. Shortly before a shuttle reaches the end of the active conveying module, respectively its conveying belt, the drive of a following neighboring conveying module in the conveying direction is additionally activated to allow a transfer to the following neighboring conveying module, such that the neighboring conveying module becomes the active conveying module. After the transfer of the shuttle, the drive of the formerly active conveying module may be deactivated. It is noted that more than one conveying module may be an active conveying module at the same time if a number of shuttles is conveyed simultaneously. If appropriate, shuttle detectors as explained before may be used to control, supervise and coordinate the conveying and transfer process. Further aspects and variants of controlling the drives of a number of conveying modules in the context of an assembly station are discussed further below.

In some embodiments with a core conveying line, the conveying line further includes a first shiftable end conveying module and a second shiftable end conveying module. The first shiftable end conveying module extends from the first core conveying line end towards the first conveying line end and the second shiftable end conveying module extends from the second core conveying line end to the second conveying line end. In such embodiment, the first shiftable end conveying module and the second shiftable end conveying module are each shiftable between an aligned configuration where the first shiftable end conveying module respectively the second shiftable end conveying module is aligned with an associated neighboring conveying module of the core conveying line, and an offset configuration where the first shiftable end conveying module respectively the second shiftable end conveying module is offset from the associated neighboring conveying module of the core conveying line in a direction transverse to the longitudinal conveying line axis. In the aligned configuration of the first shiftable end conveying module respectively the second shiftable end conveying module, a shuttle of the number of shuttles is enabled to be transferred between the first shiftable end conveying module respectively the second shiftable end conveying module and the associated neighboring conveying module of the core conveying line.

The shifting direction between the aligned configuration and the offset configuration corresponds to the direction of the conveying belt width, respectively is transverse to the longitudinal conveying line axis, and the longitudinal conveying module axis of the conveying modules. The distance between the aligned configuration and the offset configuration of the first, respectively second, shiftable end conveying module is referred to as shifting distance. A shifting direction between the aligned configuration and the offset configuration is favorably reversible. The shifting distance may in principle be different for the first and second shiftable end conveying module, but is typically identical. The first and second shiftable end conveying modules are generally shiftable independent form each other.

In the aligned configuration of a shiftable end conveying module, the edges of the conveying belt of the shiftable end conveying module are favorably aligned with the edges of the conveying belt of the neighboring conveying module as explained before. In an embodiment with a vertical (common) shuttle contact plane, the shifting direction is vertical.

In its aligned configuration, the second conveying module end of the first shiftable end conveying module generally corresponds respectively is adjacent to the first conveying module end of a neighboring conveying module in the direction towards the second conveying line end. Similarly, in its aligned configuration, the first conveying module end of the second shiftable end conveying module generally corresponds respectively is adjacent to the second conveying module end of a neighboring conveying module in the direction towards the first conveying line end.

In an arrangement with a number of conveying modules that are arranged one after the other as explained before and further first and second shiftable end conveying modules, the total length of all conveying modules with exception of the first and second shiftable end conveying module is referred to as core conveying line length, while the total length between the first and second conveying line end, including the shiftable end conveying modules, is referred to as conveying line length.

In some embodiments with shiftable end conveying modules, a conveying direction of the first shiftable end conveying module and a conveying direction of the second shiftable end conveying module are reversible.

This type of embodiment is particularly favorable for example in the context of an assembly station, respectively in combination with an assembly line, to allow transferring shuttles between a core conveying line and an assembly line as explained further below in more detail.

In some embodiments with shiftable end conveying modules, the first shiftable end conveying module and the second shiftable end conveying module are each operatively coupled with an associated shifting unit for shifting the first shiftable end conveying module respectively the second shiftable end conveying module between its aligned configuration and its offset configuration. The shifting units is typically operatively coupled to and controlled by the electronic control unit as explained before. The shifting units may in some embodiments be realized as spindle drives.

In some embodiments with shiftable end conveying modules, a shifting direction between the aligned configuration and the offset configuration of the first shiftable end conveying module, respectively the second shiftable end conveying module, is aligned with the direction of gravity. For this type of embodiment, the shiftable end conveying modules are accordingly shiftable upwards and downwards respectively vertically.

In a further aspect, an assembly system is provided. The assembly system includes a conveying system with first and second shiftable end conveying modules as explained before. The assembly system further includes an assembly line. The assembly line has a first assembly line end and an opposed second assembly line end and a longitudinal assembly line axis extending between the first assembly line end and the second assembly line end.

The assembly line includes a number of assembly stations, wherein each assembly station is designed to execute an associated dedicated assembly step in the assembly of a product with the product being coupled to a shuttle. The assembly stations are sequentially arranged along the longitudinal assembly line axis between the first assembly line end and the second assembly line end, favorably with a constant distance between neighboring assembly stations.

The assembly line axis is parallel to the conveying line axis and vertically displaced respectively offset with respect to the conveying line axis.

The assembly line further includes an assembly line drive unit. The assembly line drive unit is arranged to convey a shuttle in an assembly direction along the assembly line axis such that the shuttle passes the assembly stations one after the other. Favorably, the assembly line drive unit includes an interface structure for the guide pulleys and for the support pulleys, in particular one or more prismatic guide rails and one or more support surfaces. In this way, it is possible to convey a shuttle alternatively along the assembly line or the conveying line in a controlled manner.

In the offset configuration of the first shiftable end conveying module, the conveying belt of the first shiftable end conveying module is aligned with the assembly line drive unit, thereby allowing a shuttle to be transferred from the assembly line to the first shiftable end conveying module. Similarly, in the offset configuration of the second shiftable end conveying module, the conveying belt of the second shiftable end conveying module is aligned with the assembly line drive unit, thereby allowing a shuttle to be transferred from the second shiftable end conveying module to the assembly line. In the aligned configuration of the first respectively second shiftable end conveying module, the first respectively second shiftable end conveying module is aligned with an associated neighboring conveying module of the conveying line as explained before.

In a particular embodiment of the assembly system, the shifting direction is vertical. In such embodiment, the conveying line is—apart from the first and second shiftable end conveying module—arranged vertically above or below the assembly line, i.e. the conveying line and the assembly line are generally stacked on top of each other.

A fixed arrangement of conveying modules that are arranged one after the other along the longitudinal conveying line axis and are aligned with each other form a core conveying line. The core conveying line length substantially corresponds to the total length between the first and second end of the conveying line as explained before, without the combined length of first and second shiftable end conveying module. The core conveying line length further generally corresponds to the length of the assembly line. The shifting distance corresponds to the vertical distance between the assembly line and the core conveying line.

The here described arrangement of the assembly line and the core conveying line has—as opposed to e.g. a lateral side-by-side-arrangement—the particular advantage that the core conveying line does not require additional space in the lateral direction (traverse to the direction of gravity). With other words, the lateral space consumption of the assembly system is largely defined by the assembly line. This is particularly favorable in a clean-room environment as required, e.g. in the manufacture and assembly of many medical products, since clean room space is generally highly costly and limited.

Depending on the specific circumstances of the application, each shuttle respectively product holder may be designed to simultaneously couple to respectively hold one product only. For this setup, all products are processed sequentially at each assembly station, that is, each assembly station executes the associated assembly step for a single product only at a time. In alternative setups, the shuttles respectively product holders are designed to couple respectively hold a number of products, for example heart catheters, at the same time and the single assembly stations are designed to execute the associated assembly step for the number of products in parallel.

Further, in the following it is assumed that the first assembly line end is vertically aligned with the second core conveying line end, while the second assembly line end is vertically aligned with the first core conveying line end. The first core conveying line end and the second assembly line end are connected via the first shiftable end conveying module. Similarly, the second core conveying line end and the first assembly line end are connected via the second shiftable end conveying module. The assembly direction of the assembly line is from the first assembly line end towards the second assembly line end, while the conveying direction of the core conveying line is from the first core conveying line end towards the second core conveying line end. Other conventions, however, may be used as well.

An assembly system of the before-mentioned type allows the cyclic conveying of a shuttle respectively a number of shuttles in a virtually endless manner. A shuttle is fed to respectively received by the assembly line at the first assembly line end. The shuttle is then conveyed along the number of assembly stations one after the other towards the second assembly line end. The conveying process of a shuttle along the conveying line axis is favorably intermittent respectively non-continuous. That is, the shuttle is conveyed from one assembly station to the neighboring following assembly station where the conveying is stopped for an assembly step time to allow the execution of a corresponding assembly step, before the shuttle is conveyed to the neighboring next assembly station. The time for conveying a shuttle between neighboring assembly stations is referred to as conveying time. Favorably, the assembly step time is constant for all assembly stations and the conveying of the shuttles along the assembly line is such that all shuttles that are present at the assembly line at a given point in time are all simultaneously conveyed from one assembly station to the corresponding neighboring (next) assembly station. The overall cycle time is generally determined by the assembly step time plus the conveying time. While the assembly stations are typically equally distributed along the assembly line axis, this is not necessary. In principle, other arrangements may be used as well.

After passing the last assembly station and removing the product or products from the shuttle, each shuttle is in the next conveying cycle picked up by the first shiftable end conveying module at the second assembly line end and vertically transferred to the core conveying line and picked up by the core conveying line. For picking up the shuttle from the assembly line, a conveying direction of the first shiftable end conveying module corresponds to the assembly direction, while it is opposite to the assembly direction for transferring the shuttle to the core conveying line. During the shifting of a shiftable end conveying module, its conveying belt is generally stopped.

After being picked up by the core conveying line at the first core conveying line end, the shuttle is conveyed from the first core conveying line end to the second core conveying line end. At the second core conveying line end, the shuttle is picked up by the second shiftable end conveying module and vertically transferred to the assembly line at the first assembly line end. Operation of the core conveying line is favorably also intermittent and synchronized with the assembly line such that conveying of shuttles by the core conveying line occurs synchronously with the conveying of shuttles by the assembly line between the assembly stations and with the same cycle time. Also, the conveying speed of the shuttles when being conveyed by the conveying line favorably corresponds to the conveying speed between the assembly stations along the assembly line. Consequently, a number of shuttle parking positions exists along the core conveying line, with the shuttle parking positions being favorably equally distributed. Further, each assembly station may be aligned with a shuttle parking positions. The shuttle parking positions are shuttle positions along the core conveying line in which shuttles rest while no conveying takes place and assembly steps are executed.

Further, the operation of the shiftable end conveying modules is favorably adjusted such that the time for transporting a shuttle from a last assembly station next to the second assembly line end to a first shuttle parking position next to the first core conveying line end via the first shiftable end conveying module corresponds to the conveying time. Similarly, the time for transporting a shuttle from a last shuttle parking position next to the second core conveying line end to a first assembly station next to the first assembly line end via the second shiftable end conveying module corresponds to the conveying time. Further, the operation of the first and second shiftable end conveying modules is synchronized with the operation of the assembly line and the operation of the core conveying line such that in each conveying cycle, a shuttle is or can be transferred from the assembly line to the core conveying line, while another shuttle is or can be transferred from the core conveying line to the assembly line. The shifting between the respective aligned and offset configuration of the first and second shiftable end conveying module occurs favorably synchronous and in opposite direction. That is, while the first shiftable end conveying module moves from its aligned configuration (in alignment with the core conveying line respectively the conveying line axis) into its offset configuration (in alignment with the longitudinal assembly line axis), the second shiftable end conveying module moves from its offset configuration (in alignment with the assembly line respectively the longitudinal assembly line axis) into its aligned configuration (in alignment with the longitudinal conveying line axis).

Operation of the assembly line and in particular the assembly line drive unit, the conveying modules and in particular their drives, as well as shifting units is favorably coordinated and controlled by a control unit as explained before.

In an embodiment, the assembly system comprises a number of assembly system modules that are arranged one after the other along the longitudinal assembly line axis and conveying line axis, respectively. Each assembly system module may comprise a number of assembly stations and a number of conveying modules of the core conveying line. Further in such design, the assembly line drive unit may be realized by a number of assembly line drive modules that are arranged one after the other to form, in combination, the assembly line drive unit. Similarly, the conveying modules of the assembly system modules form, in combination, the core conveying line of the assembly system.

The assembly system modules may be designed such that a number of assembly system modules can be arranged in a line one after the other. The conveying modules of the single assembly system modules are aligned with each other and the assembly line drive modules are aligned with each other. A shuttle may accordingly be transferred between neighboring assembly line drive modules of the assembly line or between neighboring conveying modules of the core convening line. The first and second shiftable end conveying modules of such embodiment are arranged next to the outermost conveying system modules in the longitudinal direction.

This kind of arrangement is particularly favorable since it enables a highly flexible setup that may be adapted for changing requirements by simply adding, removing, and/or replacing conveying system modules.

In a typical design, a conveying system module includes one assembly line drive module and one conveying module, with the assembly line drive module and the conveying module having the same length in the longitudinal direction. In alternative embodiments, however, the number of conveying modules and assembly line drive modules in an assembly line module are different. By way of example, there may be one conveying line module and two assembly line drive modules, with the assembly line drive modules, each having half the length of the conveying module, or vice versa. Typically, each assembly system module includes one assembly station.

In an embodiment of the assembly system, the assembly line drive unit includes an electromagnetic coil arrangement. The electromagnetic coil arrangement forms a linear motor stator and extends along the assembly line axis. The electromagnetic coil arrangement is arranged and controllable to convey a shuttle along the assembly line axis via magnetic forces between the electromagnetic coil arrangement and the magnetic member of the shuttle. A suited drive system based on an electromagnetic coil arrangement as explained before is commercial available, for example, as ACOPOStrak and supplied by B&R Industrial Automation GmbH, Eggelsberg, Austria.

In an embodiment, the assembly system includes a first assembly line shuttle stopper and a second assembly line shuttle stopper, wherein the first assembly line shuttle stopper includes a first assembly line blocking structure and the second assembly line shuttle stopper includes a second assembly line blocking structure. The first assembly line blocking structure and the second assembly line blocking structure are each arranged movable, in particular independently movable, between a respective releasing configuration respectively releasing position and an alternative respective blocking configuration respectively blocking position. An assembly line shuttle conveying room of the assembly line is blocked at the first assembly line end by the first assembly line blocking structure in the blocking configuration of the first assembly line blocking structure and is released respectively accessible in the releasing configuration of the first assembly line blocking structure. Similarly, the assembly line shuttle conveying room is blocked at the second assembly line end by the second assembly line blocking structure in the blocking configuration of the second assembly line blocking structure and is released respectively accessible in the releasing configuration of the second assembly line blocking structure.

A design of the assembly station with assembly line shuttle stoppers is favorable regarding device safety as well as the avoidance of damage in case of malfunctions. For example, in embodiments where the assembly line drive unit includes a coil arrangement respectively linear motor as explained before, a device malfunction may under certain circumstances result in a shuttle being pushed out of the assembly line respectively the assembly line shuttle conveying room at either of the assembly line ends at high speed and in a projectile-like manner. By providing shuttle stoppers in accordance with the present disclosure, a movement respectively transfer of a shuttle into or out of the assembly line shuttle conveying room of at the first respectively second assembly line end is possible only if the first respectively second assembly line blocking structure is in its releasing configuration but is physically blocked by the respective assembly line blocking structure in its blocking configuration.

The first assembly line blocking structure may be arranged at the first assembly line end respectively at the transition of the assembly line and the second shiftable end conveying module. Similarly, the second assembly line blocking structure may be arranged at the second assembly line end respectively at the transition of the assembly line and the first shiftable end conveying module. The first and second assembly line blocking structure include or may in each case be designed as a door or slider.

In an embodiment including assembly line shuttle stoppers, the first and second assembly line blocking structure may in each case be arranged to be movable between their respective releasing configuration and blocking configuration by a linear movement. The first and second assembly line shuttle stopper may each include a linear guide with a guide rail and a runner. For each of the first and second assembly line shuttle stopper, the guide rail may be fixed to a base or frame structure respectively base of the assembly system and the assembly line blocking structure is fixed to the runner and is linearly movable together with the runner along an axis as defined by the respective guide rail in a linear manner.

In a typical embodiment, the guide rails of the assembly line shuttle stoppers have in each case an axis that extends parallel to respectively is aligned with the shifting direction of the first respectively second shiftable end conveying module between its respective aligned and offset configuration. The shifting directions may be parallel and may in particular be vertical. The linear movement of the first respectively second assembly line blocking structure between their respective releasing and blocking configuration is a vertical movement for such embodiment. The distance between the aligned configuration and the offset configuration of each of the shiftable end conveying modules, i.e. the shifting distance, may, however, be larger than the distance by which an assembly line blocking structures moves between its respective releasing configuration and blocking configuration, respectively. In alternative embodiments however, the linear movement may be oriented differently and e.g. be a horizontal movement. In further embodiments, the movement of the first respectively second assembly line blocking structure between their respective releasing and blocking configuration is a pivoting movement.

In an embodiment including assembly line shuttle stoppers, the first assembly line blocking structure is movable from the blocking configuration of the first assembly line blocking structure into the releasing configuration of the first assembly line blocking structure by the second shiftable end conveying module and the second assembly line blocking structure is movable from the blocking configuration of the second assembly line blocking structure into the releasing configuration of the second assembly line blocking structure by the first shiftable end conveying module.

Moving of the first respectively second assembly line blocking structure by the second respectively first shiftable end conveying module is realized by way of physical interaction, in particular abutment or engagement, in a releasable manner. For this type of embodiment, the shifting units that may be provided for shifting the end conveying modules between their respective aligned configuration and offset configuration as explained before serve at the same time as drives for moving the assembly line blocking structures between their respective releasing configuration and blocking configuration, with the shiftable end conveying modules serving as intermediate elements between the shifting units and the assembly line blocking structures.

Moving the first assembly line blocking structure into its releasing configuration as explained before may in particular be realized by the second shiftable end conveying module pushing the first assembly line blocking structure, in particular in upwards direction (against the direction of gravity), thereby lifting the first assembly line blocking structure. Similarly, moving the second assembly line blocking structure into its releasing configuration may in particular be realized by the first shiftable end conveying module pushing the second assembly line blocking structure, in particular in upwards direction (against the direction of gravity), thereby lifting the second assembly line blocking structure. The pushing may be realized by the second respectively first shiftable end conveying module abutting the first respectively second assembly line blocking structure.

In alternative embodiments, however, dedicated actuators may be provided in operative coupling with the first respectively second assembly line blocking structure to move the first respectively second assembly line blocking structure, in particular into its respective releasing configuration.

In an embodiment including shuttle stoppers, the first and second assembly line blocking structure are in each case arranged to be movable into their respective blocking configuration by way of gravity. For such embodiment, a gravitational force favorably acts, in particular continuously, on the first and second assembly line blocking structure in direction of their respective blocking configuration. For moving the first respectively second assembly line blocking structure into a configuration different from the respective blocking configuration, in particular the respective releasing configuration, and/or holding the first respectively second assembly line blocking structure in such configuration, the gravitational force is accordingly cancelled out by a counterforce, especially an upward-directed counterforce. Such counterforce may in particular be exerted onto the first respectively second assembly line blocking structure by the second respectively first shiftable end conveying module as explained before. Such type of embodiment provides a particularly high level of security since the blocking configuration is necessarily assumed if no counterforce is exerted.

The cooperation and coordination between the first respectively second assembly line shuttle stopper with the second respectively first shiftable end conveying module may be as follows: First, it is assumed that the first respectively second shiftable end conveying module is in its respective aligned configuration and the associated second respectively first assembly line blocking structure is in its blocking configuration, thereby preventing a movement of a shuttle into and in particular out of the assembly line shuttle conveying room. If the first respectively second shiftable end conveying module moves, generally in upwards direction, towards its respective offset configuration, it will at some point abut or engage the second respectively first assembly line blocking structure. As the movement of the first respectively second shiftable end conveying module continuous, the second respectively first assembly line blocking structure moves together with the first respectively second shiftable end conveying module and is accordingly pushed upwards respectively lifted. In the offset configuration of the first respectively second shiftable end conveying module, the second respectively first assembly line blocking structure assumes its respective releasing configuration. A movement respectively transfer of a shuttle between the first respectively second shiftable end conveying module and the assembly line shuttle conveying room is accordingly enabled.

If the first respectively second shiftable end conveying module moves, generally in downwards direction, from its respective offset configuration towards its respective aligned configuration, the second respectively first assembly line blocking structure will first follow this downward movement towards its respective blocking configuration, thereby blocking the assembly line shuttle conveying room. In its respective blocking configuration, the second respectively first assembly line blocking structure may hit respectively abut a respective blocking structure, resulting in the blocking configuration being maintained, while the first respectively second shiftable end conveying module may continue its movement until it assumes its respective aligned configuration.

In an embodiment, the assembly system includes a first conveying line shuttle stopper and a second conveying line shuttle stopper, wherein the first conveying line shuttle stopper includes a first conveying line blocking structure and the second conveying line shuttle stopper includes a second conveying line blocking structure. The first conveying line blocking structure and the second conveying line blocking structure are each arranged movable between a respective releasing configuration respectively releasing position and an alternative respective blocking configuration respectively blocking position. A core conveying line shuttle conveying room of the core conveying line is blocked at the first core conveying line end by the first conveying line blocking structure in the blocking configuration of the first conveying line blocking structure and is released in the releasing configuration of the first conveying line blocking structure. Similarly, the core conveying line shuttle conveying room is blocked at the second core conveying line end by the second conveying line shuttle stopper in the blocking configuration of the second conveying line shuttle stopper and is released in the releasing configuration of the second conveying line shuttle stopper. The core convening line shuttle conveying room is a room in which a shuttle is located when being conveyed by the core conveying line.

Similar to assembly line shuttle stoppers as discussed before, conveying line shuttle stoppers are favorable regarding device safety as well as the avoidance of damage in case of malfunctions. For example, a shiftable end conveying module may not be in the required aligned position to receive a shuttle from the core conveying line due to a control error and/or device defect. In such case, a shuttle may fall of the core conveying line with the result of being potentially irreparably damaged and/or resulting in further damage of the assembly line and potential injury of an operator. By providing conveying line shuttle stoppers in accordance with the present disclosure, a movement respectively transfer of a shuttle into or out of the conveying room of the core conveying line is possible only if the first respectively second conveying line blocking structure is in its releasing configuration but is physically blocked by the respective conveying line blocking structure in its blocking configuration.

The first convening line blocking structure may be arranged at the first core conveying line end respectively at the transition of the first core conveying line and the first shiftable end conveying module. Similarly, the second conveying line blocking structure may be arranged at the second core conveying line end respectively at the transition of the second core conveying line and the second shiftable end conveying module. The first and second conveying line blocking structure include or may in each case be designed as a door or slider.

In an embodiment including conveying line shuttle stoppers, the first and second conveying line blocking structure are in each case arranged to be movable between their respective releasing configuration and blocking configuration by a linear movement. The first and second conveying line shuttle stopper may each include a linear guide with a guide rail and a runner. For each of the first and second conveying line shuttle stopper, the guide rail may be fixed to the base or frame structure respectively base of the assembly system and the conveying line blocking structure is fixed to the runner and is linearly movable together with the runner along an axis as defined by the respective guide rail in a linear manner.

In a typical embodiment, the guide rails of the conveying line shuttle stoppers have in each case an axis that extends parallel to respectively is aligned with the shifting direction of the first respectively second shiftable end conveying module between its respective aligned and offset configuration. The shifting directions may be parallel and may in particular be vertical. The linear movement of the first respectively second conveying line blocking structure between their respective releasing and blocking configuration is a vertical movement for such embodiment. The distance between the aligned configuration and the offset configuration of each of the shiftable end conveying modules, i.e. the shifting distance, may, however, be larger than the distance by which a conveying line blocking structures moves between its respective releasing configuration and blocking configuration, respectively. In alternative embodiments however, the linear movement may be oriented differently and e.g. be a horizontal movement. In further embodiments, the movement of the first respectively second conveying line blocking structure between their respective releasing and blocking configuration is a pivoting movement.

In an embodiment including conveying line shuttle stoppers, the first conveying line blocking structure is movable from the releasing configuration of the first conveying line blocking structure into the blocking configuration of the first conveying line blocking structure by the first shiftable end conveying module and the second conveying line blocking structure is movable from the releasing configuration of the second conveying line blocking structure into the blocking configuration of the second conveying line blocking structure by the second shiftable end conveying module.

Moving of the first respectively second conveying line blocking structure by the first respectively second shiftable end conveying module is realized by way of physical interaction, in particular abutment, locking, and/or or engagement, favorable in a releasable manner. For this type of embodiment, the shifting units that may be provided for shifting the shiftable end conveying modules between their respective aligned configuration and offset configuration as explained before serve at the same time as drives for moving the conveying line blocking structures between their respective releasing configuration and blocking configuration, with the shiftable end conveying module serving as intermediate elements between the shifting units and the conveying line blocking structures.

Moving the first conveying line blocking structure from its releasing configuration into its blocking configuration as explained before may be realized by the first shiftable end conveying module pulling the first conveying line blocking structure in upwards direction (against the direction of gravity), thereby lifting the first conveying line blocking structure. Similarly, moving the second conveying line blocking structure from its releasing configuration into its blocking configuration may be realized by the second shiftable end conveying module pulling the second conveying line blocking structure in upwards direction (against the direction of gravity), thereby lifting the second conveying line blocking structure. For pulling of the first respectively second conveying line blocking structure by the respective shiftable end conveying module, the first respectively second conveying line blocking structure and the first respectively second shiftable end conveying module may be locked, in particular magnetically locked, as explained below.

In an embedment including conveying line shuttle stoppers, the first conveying line blocking structure is lockable, in particular magnetically lockable, with respect to the core conveying line and is lockable, in particular magnetically lockable, with respect to the first shiftable end conveying module. Similarly, in such embodiment, the second conveying line blocking structure is lockable, in particular magnetically lockable, with respect to the core conveying line and is lockable, in particular magnetically lockable, with respect to the second shiftable end conveying module. As will be explained in more detail further below, an end conveying line blocking structure is generally alternatively locked with respect to one of the core conveying line or the respective shiftable end conveying module at each point of time, but not both. In a transition phase, however, it may be for a moment respectively short period of time coupled locked respectively with respect to both.

Magnetic locking may be achieved by a magnet, typically a permanent magnet, being arranged at the first respectively second shiftable end conveying module as well as at the core conveying lines respectively core conveying line ends. The first and second conveying line blocking structure may be made of ferromagnetic material, for example steel sheet metal, or comprise ferromagnetic elements or a ferromagnetic structure, thereby enabling a magnetic coupling. Alternatively, or additionally, one or more magnets may be arranged at the first respectively second conveying line blocking structure to magnetically couple with corresponding ferromagnetic structures or magnets arranged at the first respectively second shiftable end conveying module and first respectively second core conveying line end.

Regarding the shiftable end conveying modules, the first and second shiftable end conveying module may in particular have in each case a first respectively second end conveying module locking magnet arranged at its lower side respectively bottom side, such that the first respectively second conveying line blocking structure can be attached and magnetically locked to the underside of the respective shiftable end conveying module, with the first respectively second end conveying module locking magnet supporting the respective conveying line blocking structure against gravity.

Regarding the core conveying line, a structure of the core conveying line and/or a frame structure or base of the assembly system may have a first and second conveying line locking magnet such that the first respectively second conveying line blocking structure can be attached and magnetically locked with respect to the core conveying line against the force of gravity in its respective locking configuration.

For this type of design operation may be as follows. It is first assumed that a first respectively second conveying line blocking structure is in its blocking configuration and is magnetically locked in this configuration. In this configuration, the conveying room of the core conveying line is accordingly blocked at the first respectively second core conveying line end. The first respectively second shiftable end conveying module is assumed to be in its offset configuration. When moving towards its aligned configuration, e.g. in downwards direction, the first respectively second shiftable end conveying module locking magnet respectively its contact surface will at some point hit the first respectively second conveying line blocking structure, resulting in a magnetic coupling being established between the first respectively second shiftable end conveying module and the first respective second conveying line blocking structure. At this point in time, the first respectively second conveying line blocking structure is temporarily magnetically coupled with both the core conveying line (via the first respective second conveying line locking magnet) as well as the first respectively second shiftable end conveying module (via the first respective second end conveying module locking magnet).

As the movement of the first respectively second shiftable end conveying module towards its aligned configuration continues, the magnetic locking of the first respectively second conveying line blocking structure with the first respectively second conveying line locking magnet is cancelled due to the force exerted by the first respectively second shiftable end conveying module respectively its shifting unit and the first respectively second conveying line blocking structure further moves together with the first respectively second shiftable end conveying module in downwards direction, until the first respectively second shiftable end conveying module finally reaches its respective aligned configuration with the first respectively second core conveying line end. A damper or bumper, e.g. a spring-based damper, may be provided for each of the first respectively second conveying line blocking structure on which the first respectively second conveying line blocking structure rests in the aligned configuration of the first respectively second shiftable end conveying module.

As the first respectively second shiftable end conveying module again moves upwards towards its offset configuration, the first respectively second conveying line blocking structure will move accordingly and be pulled upwards due to the magnetic locking.

At some point, the first respectively second conveying line blocking structure will come into contact with the first respectively second conveying line locking magnet, resulting in a magnetic coupling respectively locking. At this point in time, the first respectively second conveying line blocking structure is again temporarily magnetically coupled with both the core conveying line (via the first respective second conveying line locking magnet) as well as the first respectively second shiftable end conveying module (via the first respective second end conveying module locking magnet). As the first respectively second shiftable end conveying module continues its upwards movement towards its offset configuration, the magnetic coupling with the first respectively second conveying line blocking structure will be cancelled, and the first respectively second conveying line blocking structure will stay magnetically coupled to the core conveying line.

In a further aspect, a method for conveying a shuttle is provided. The method may in particular be employed in the context of an assembly system, but is not limited to this application. The method includes providing the shuttle with a magnetic member. The method further includes providing a circumferentially closed conveying belt, the conveying belt extending along a longitudinal conveying line axis. The conveying belt includes a counter-magnetic member, the counter-magnetic member extending substantially along the whole circumference of the conveying belt. The method further includes releasably coupling the shuttle to the conveying belt via the magnetizable member interacting with the magnetic member by way of ferromagnetic forces. The method further includes driving the conveying belt with a circumferential speed.

In a further aspect, a method for assembling a product, in particular a medical product is disclosed. The method includes using an assembly system and/or a method for conveying a shuttle according to any embodiment as discussed above or further below.

BRIEF DESCRIPTION OF THE DRAWINGS

FIG. 5a shows an embodiment of a shuttle in front view;

FIG. 5b shows the shuttle of FIG. 5a in a (left) side view;

FIG. 5c shows the shuttle of FIG. 5a in a rear view;

DETAILED DESCRIPTION OF THE INVENTION

Reference will now be made in detail to certain embodiments, examples of which are illustrated in the accompanying drawings, in which some, but not all features are shown. In-deed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like features. For the sake of clarity, features may not be labelled with a reference sign in some figures if appearing in more than one figure. Further, all instances of a feature may be labelled if a feature is present more than once in one and the same figure.

Figure 1:
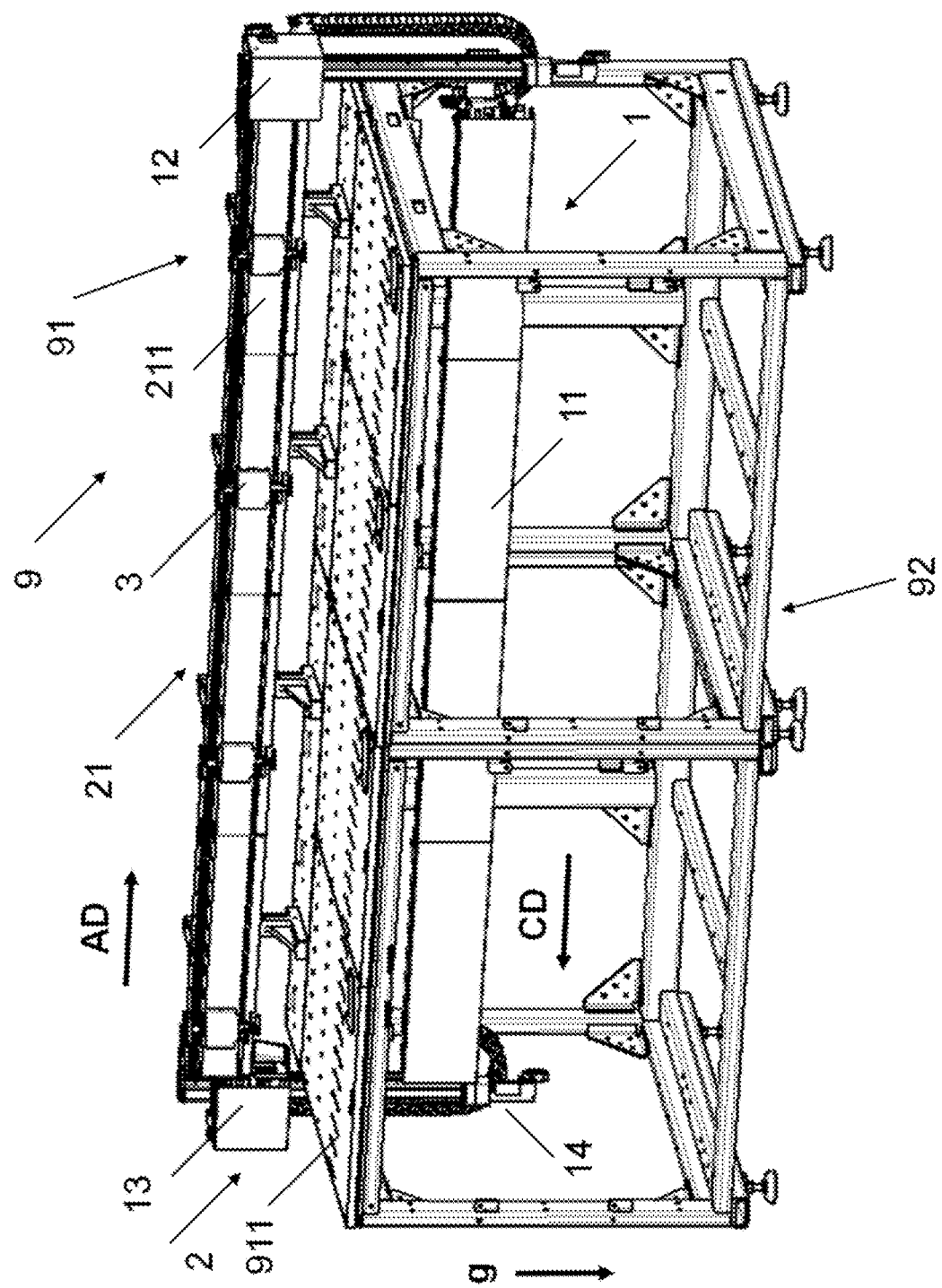
FIG. 1 shows an exemplary embodiment of an assembly system in a schematic perspective view.

In the following, reference is first made to FIG. 1. FIG. 1 shows an exemplary assembly station 9 in accordance with the present disclosure in a perspective view. In this example, the assembly station 9 comprises four assembly system modules 91 that are arranged in a line one after the other. In the shown embodiment, the assembly system modules 91 are mounted to and supported by a frame structure respectively base 92. In the shown embodiment, each assembly system module 91 further comprises a horizontally arranged platform element 911 that is supported by the frame structure respectively base 92 and carries part of the assembly line drive unit 21 and an assembly station 22-1, 22-2, 22-3, 22-4 (see FIG. 2). In the free room below the platform elements, a control unit 4 (see FIG. 4) may be arranged fully or partly. The platform elements 911 form, in combination, a continuous horizontal platform. In the shown embodiment, each assembly system module 91 comprises an assembly line drive module 211, with the assembly line drive modules 211, in combination, forming the assembly line drive unit 21. The assembly line drive modules 211 are arranged and aligned to allow the continuous conveying of shuttles 3 (see also FIGS. 2, 3). Each of the assembly line drive modules 211 is based on an electromagnetic coil arrangement as explained in the general description. The assembly line drive modules 211 and the assembly stations 22-1, 22-2, 22-3, 22.4 are in this example arranged above respectively on top of the platform elements 911.

Below the platform that is formed by platform elements 911, conveying modules 11 are arranged in parallel to the assembly line 2. In the shown embodiment, one conveying module 11 is present per assembly system module 91 and assembly line drive module 211. That is, each assembly station module 91 comprises one assembly line drive module 211 and one conveying module 11. The conveying modules 11 form, in combination, a core conveying line 16 (see FIG. 3). The conveying modules 11 are arranged and aligned to allow a continuous conveying of shuttles from a first conveying line end 1a to the second conveying line end 1b (see FIG. 3) along a conveying direction CD, the conveying direction CD being opposite to the assembly direction AD. The direction of gravity is indicated by g.

In addition to the general conveying modules 11, the conveying line 1 includes a first shiftable end conveying module 12 and the second shiftable end conveying module 13. As explained in the general description in more detail, the shiftable end conveying modules 12, 13 are shiftable in vertical direction between an aligned configuration where the first shiftable end conveying module 12 respectively the second shiftable end conveying module 13 is aligned with a neighboring conveying module 11, and an offset configuration where it is aligned with the assembly line drive unit 21 respectively an outermost assembly line drive module 211. In the configuration shown in FIG. 1, the first shiftable end conveying module 12 is in its offset position, while the second shiftable end conveying module 13 is in an intermediate position. For shifting the end conveying modules 12, 13 between their aligned respectively offset configurations, a shifting unit 14 is associated with and operatively coupled to each of the shiftable end conveying modules 12, 13. Exemplarily, the shifting units 14 are realized as vertically arranged spindle drives.

It is noted that in FIG. 1 the single elements and components of the conveying modules 11 are not visible but arranged behind the cover, which, however, may also be omitted.

Figure 2:
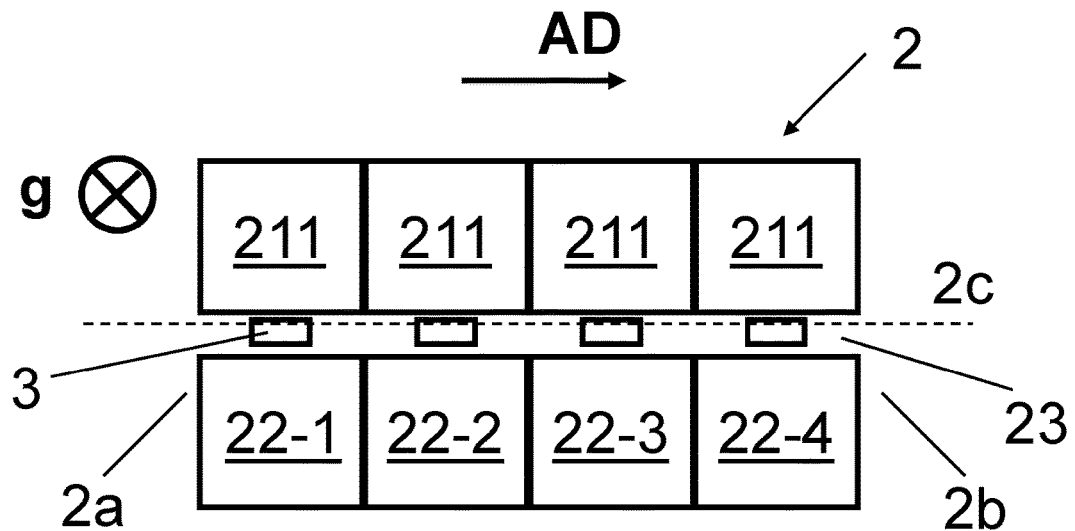
FIG. 2 schematically shows the geometric arrangement of the assembly line drive modules and associated assembly stations of an assembly system according to FIG. 1.

FIG. 2 shows the geometric arrangement of the assembly line drive modules 211, and associated assembly stations 22-1, 22-2, 22-3, 22-4. It can be seen that an assembly station is arranged opposite to each assembly line drive module 211 such that a shuttle can be conveyed to, respectively pass the assembly stations 22-1, 22-2, 22-3, 22-4 in sequential order along the assembly direction AD. As explained before, each assembly station 22-1, 22-2, 22-3, 22-4 is designed to a particular assembly step in the assembly of a product, for example a balloon catheter. The assembly line drive modules 211 and the assembly stations 22-1, 22-2, 22-3, 22-4 are commonly arranged between the first assembly line end 2a and the second assembly line end 2b along the longitudinal assembly line axis 2c. The longitudinal assembly line axis 2c extends in a common shuttle contact surface (not referenced) with shuttles 3. Between the assembly line drive modules 211 and the assembly stations 22-1, 22-2, 22-3, 22-4, a free assembly line shuttle conveying room 23 of the assembly line 2 is present in which the shuttles 3 are conveyed.

Figure 3:
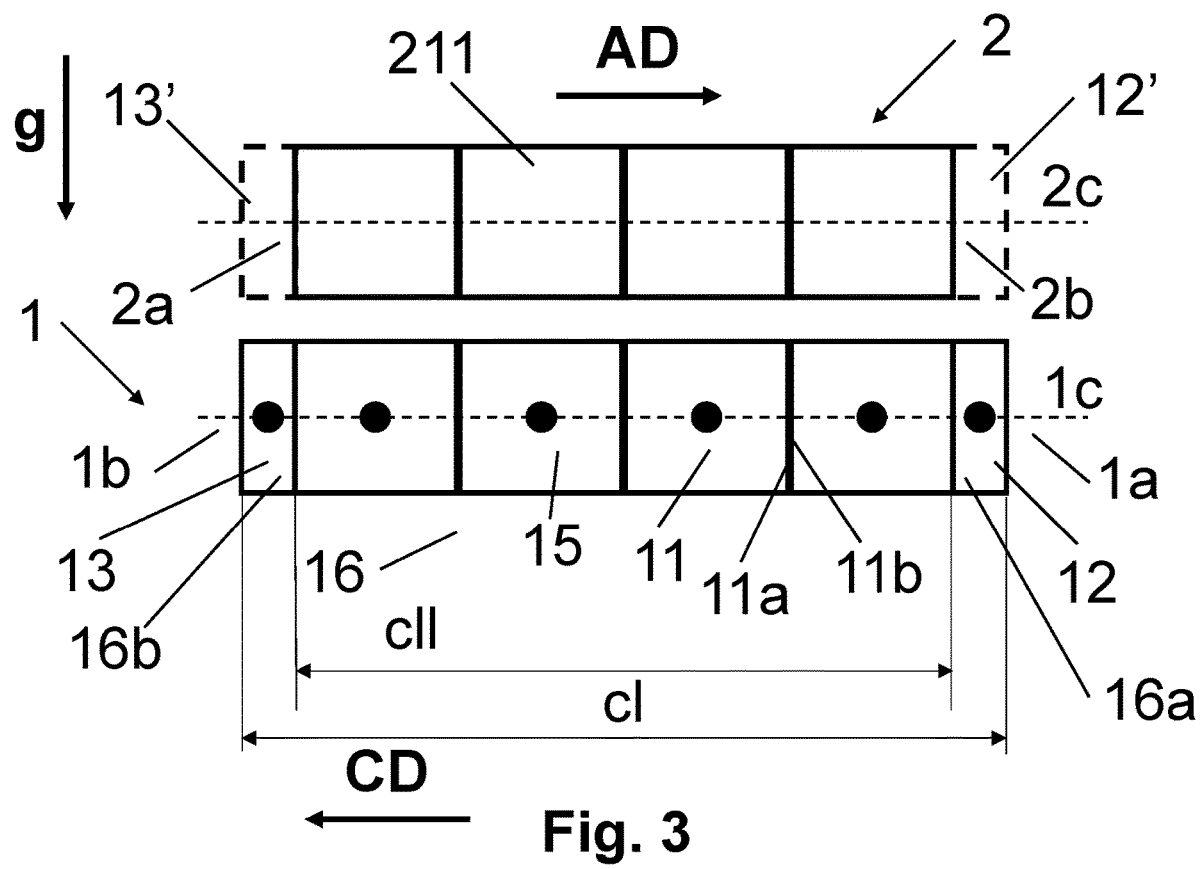
FIG. 3 schematically shows the geometric arrangement of assembly line drive modules and conveying modules of an assembly system according to FIG. 1.

FIG. 3 shows the geometric arrangement of assembly line drive modules 211 and conveying modules 11, 12, 13 in a schematic side view. The conveying modules 11 form, in combination, the core conveying line 16, having a core conveying line length cll. It can be seen that the first core conveying line end 16a is aligned with the second assembly line end 2b, and the second core conveying line end 16b is aligned with the first assembly line end 2a. The assembly line length generally corresponds to the core conveying line length cll. Further, the overall conveying line length cl generally corresponds to the core conveying line length cll plus the length of the first 12 and second 13 shiftable end conveying modules. Further, the second conveying module end 11b (pointing towards the second conveying line end 1b) of a conveying module 11 generally corresponds to the first convening module end 11a (pointing towards the first conveying line end 1a) of neighboring conveying module 11 with respect to the conveying direction CD.

In FIG. 3, the end conveying modules 12, 13 are shown in solid in their aligned configuration and dashed (referenced 12', 13') in their offset configuration. The conveying line axis 1c lies exemplarily in the shuttle contact plane of the conveying belts of the conveying modules 11 respectively the first 12 and second 13 shiftable end conveying modules in their respective aligned configuration as explained in the general description and further below. It can be seen that the conveying line axis 1c is parallel to and vertically offset with respect to the assembly line axis 2c. When a shuttle 3 is coupled to a conveying module 11, 12, 13 respectively its conveying belt (see also FIG. 8), the conveying module 11, 12, 13 and the shuttle 3 establish a shuttle conveying module combination as explained in the general description.

Further, exemplarily one shuttle detector 15 is provided per conveying module 11 respectively shiftable end conveying module 12, 13 and arranged at the central position of the conveying module 11 respectively shiftable end conveying module 12, 13. Other sensor arrangements, however, could be used as well.

Figure 4:
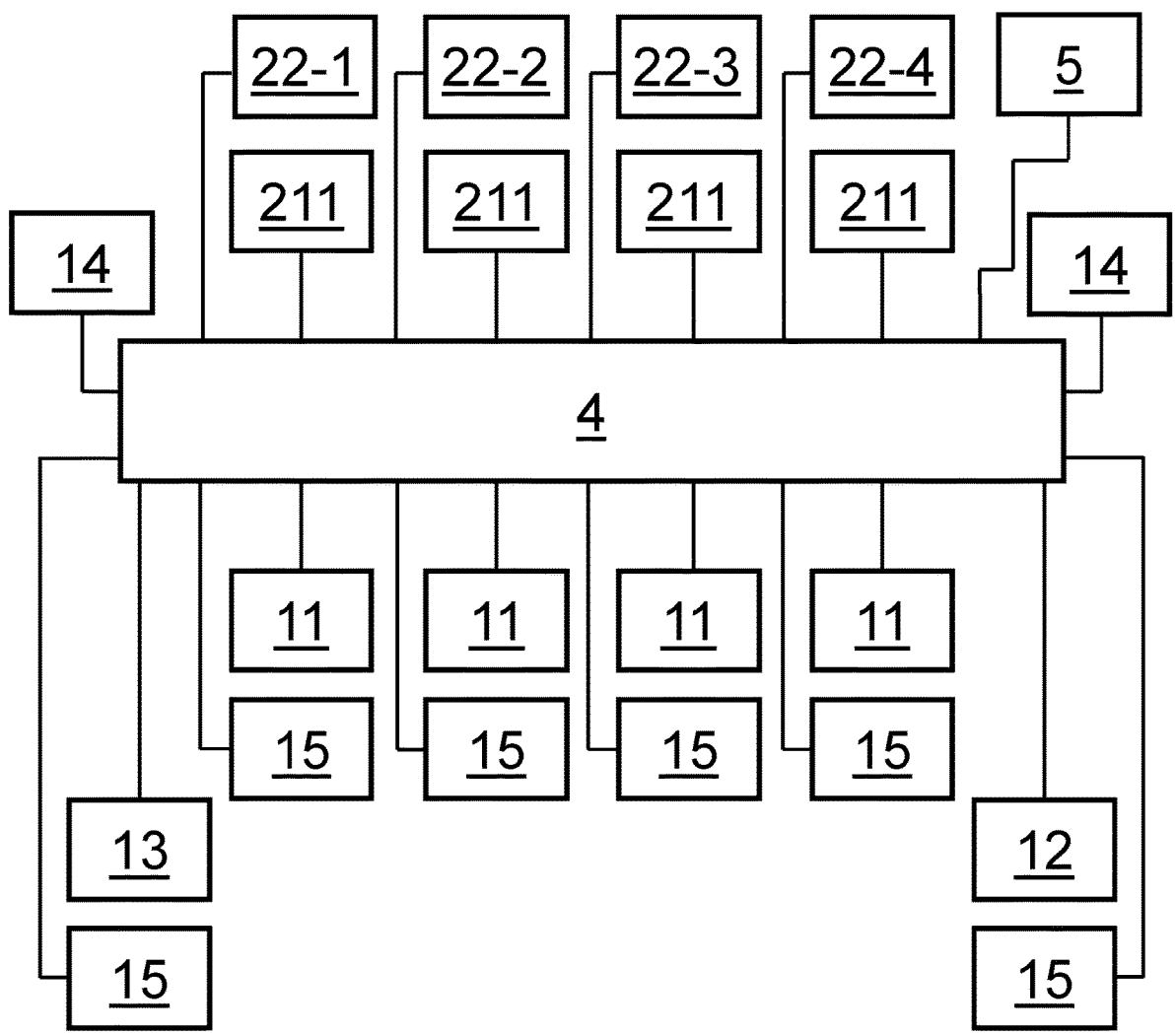
FIG. 4 shows functional units of an assembly system in accordance with the present disclosure in a simplified and schematic functional view.

In the following, reference is additionally made to FIG. 4, showing functional units of an assembly system in accordance with the present disclosure in a simplified and schematic functional view. The assembly system comprises a control unit 4 that controls, coordinates and supervises the single structural and functional units and components as explained before and further below. The control unit 4 may optionally further be operatively coupled with a higher-level or overall control system 5 that may, for example control operation of and coordinate a number of assembly systems and/or further assistance such as transporting systems and handling robots.

The control unit 4 is typically based on one or more programmable devices, such as programmable logic controllers (PLCs), And/or industrial PCs, running a corresponding software code. It is noted that the control unit can be realized by any combination of hardware and software components as required and feasible in a specific context. The control unit 4 may further include readily available control devices, such as actuator/motor controllers. While shown as single functional unit, the control unit 4 may further be distributed and partly integrated, for example, with the single assembly system modules 91, assembly line drive modules 221, assembly stations 22-1, 22-2, 22-3, 22-4, and conveying modules 11, 12, 13.

Figure 5D:
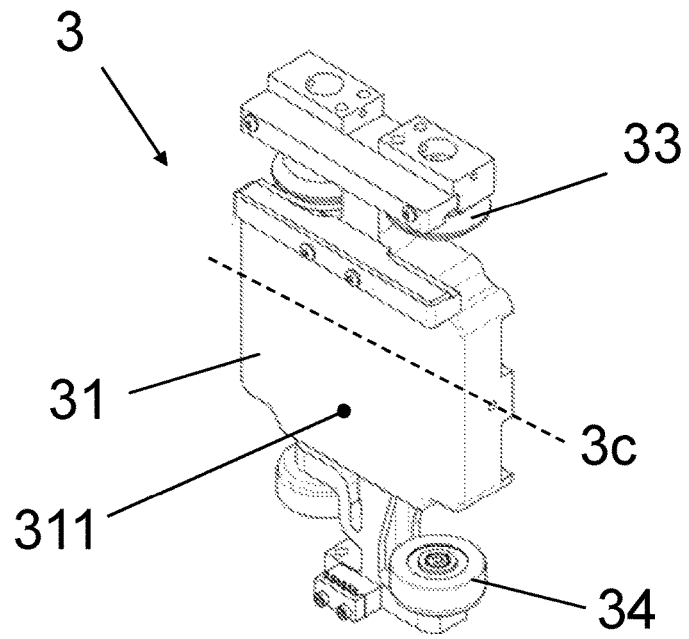
FIG. 5d shows the shuttle of FIG. 5a in a perspective view.

In the following, reference is further made to FIGS. 5a, 5b, 5c, 5d showing an exemplary design of a shuttle 3 in front view (FIG. 5a), side view (FIG. 5b) rear view (FIG. 5c), and perspective view (FIG. 5d). The front side of a shuttle 3 is the side that contacts, in operation, conveying belt respectively assembly line drive.

The shuttle body 31 is made of a non-magnetic material, for example aluminum, suited plastic material or any combination thereof. The shuttle body 31 has a generally planar conveying belt contact surface 311 that also serves as assembly line coupling surface. Integrated into the shuttle body 31 is a magnetic member 32 as explained in the general description. The magnetic member 32 is realized as permanent magnet. The magnetizable member 32 does not need to extend to conveying belt contact surface 311 because of the generally non-magnetic properties of the shuttle body 31. On one side of the shuttle body 31 (above the shuttle body 31 in operation), a pair of guide pulleys 33 is arranged to be received by corresponding prismatic grooves of the prismatic guide rail 114 as explained above and further below. The guide pulleys 33 are offset with respect to each other vertically and along the longitudinal shuttle axis 3c and are connected to the shuttle body 31. On an opposite side of the shuttle body 31 (below the shuttle body 31 in operation), a pair of support pulleys 34 is arranged to interact with a support member 116 as explained above and further below. The support pulleys 34 are generally arranged and connected to the shuttle body 31 in the same manner as the guide pulleys 33. In contrast to the guide pulleys 33, however, the support pulleys 34 are not prismatic.

The product holder coupling structure 35 is exemplarily realized by an arrangement of locating pins 351 and threaded holes 352 that are arranged on both sides of the longitudinal shuttle axis 3c as generally known in the art. The locating pins 351 and threaded holes 352 are designed to engage with corresponding counter-structures of a product holder (not shown). Further, the product holder coupling structure 35 comprises, in this embodiment, an elongated key 353 that extends along the length of the shuttle body 31 symmetrically to the longitudinal shuttle axis 3c. The key 353 engages, in an operational configuration, with a corresponding groove of a product holder. It is noted that the shown design, in particular the design of the product holder coupling structure 35 is merely exemplary and other designs may be used as well in dependence of the specific application.

In dependence of the specific application, the shuttle 3 may have different lengths respectively extensions in the direction of the longitudinal shuttle axis 3c. Some design features, such as the product holder coupling structure 35, may be realized differently in dependence of the shuttle length. By way of example, a shuttle 3 may have a length of 100 mm or 50 mm.

Figure 6:
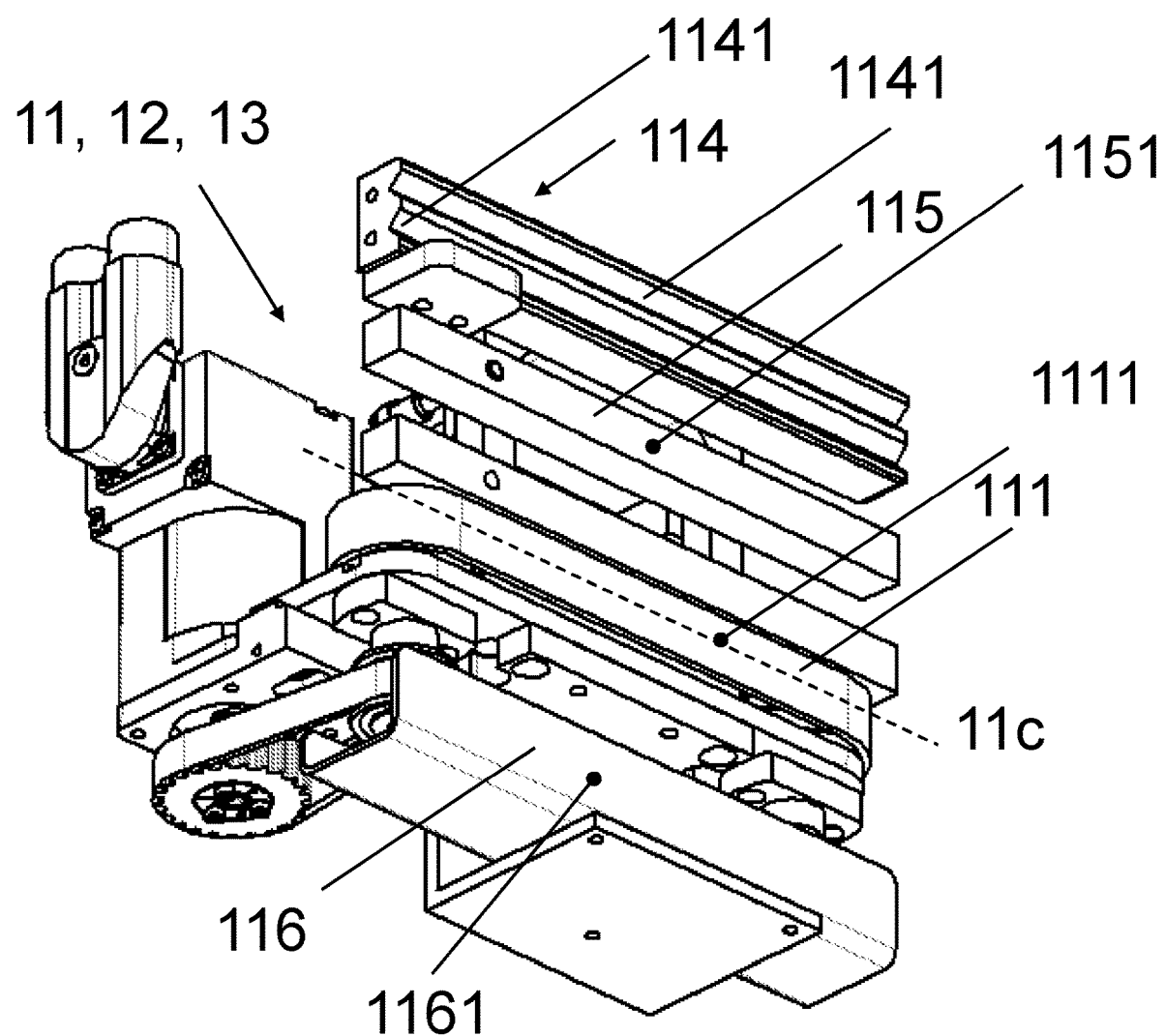
FIG. 6 shows an embodiment of a conveying module in a perspective view.
Figure 7:
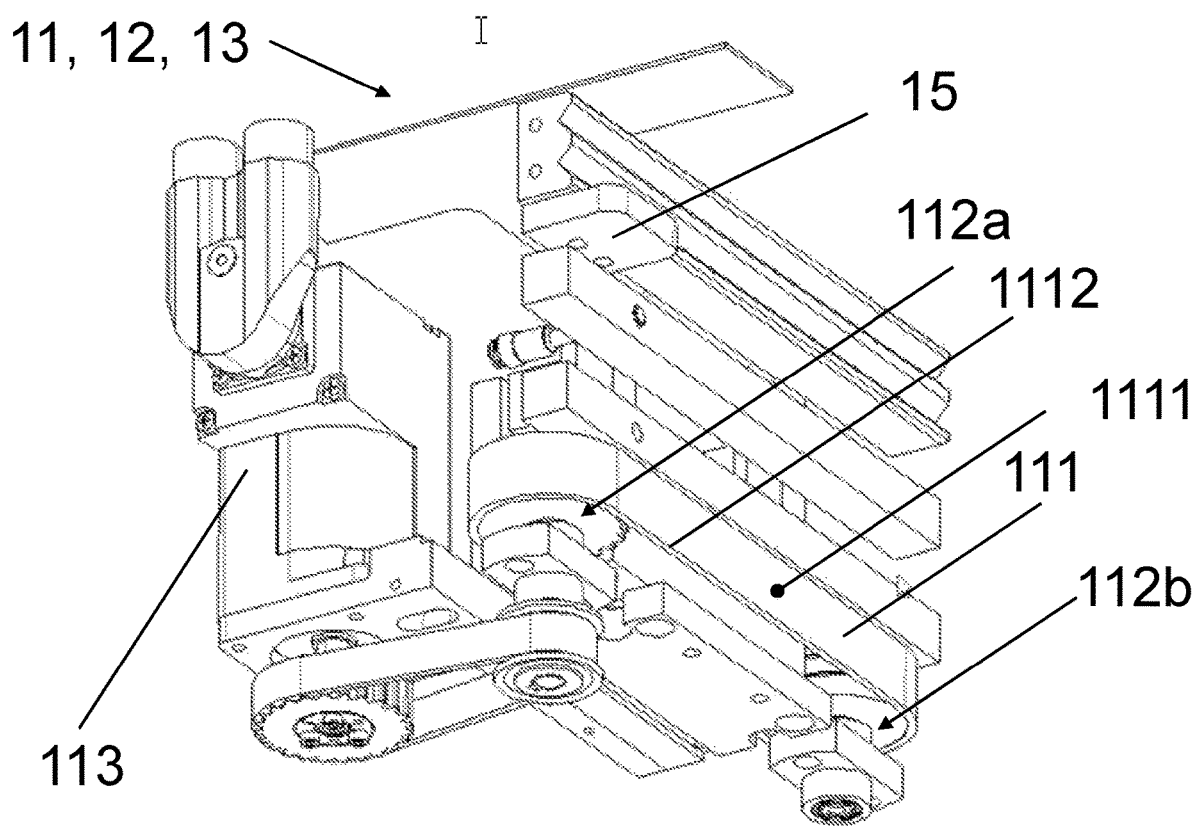
FIG. 7 shows an embodiment of a conveying module in a perspective view similar to FIG. 6.

FIG. 6 shows an embodiment of a conveying module 11 respectively first 12 or 13 shiftable end conveying module in perspective view. FIG. 7 also shows a conveying module 11 respectively first 12 or 13 shiftable end conveying module in perspective view, similar to FIG. 6. However, in FIG. 7 some elements are removed to provide a clearer view on the conveying belt 111.

By way of example, the shown conveying module is a first or second shiftable end conveying module 12, 13. The further conveying modules 11, however, may be of substantially the same design, but may have a longer conveying module length respectively extension along the conveying module axis 11c. Further, the shiftable end conveying modules 12, 13 are, in contrast to the other conveying modules 11, designed for coupling to a shifting unit 14, e.g. a spindle drive, as explained before.

The conveying belt 111 extends between and is routed around a first pulley 112a and a second pulley 112b (best visible in FIG. 7) as explained before. In the shown design, the first pulley 112a is coupled to a drive 113, e.g., exemplarily realized as electric motor-gear-unit, via a toothed transmission belt (not separately referenced). Other arrangements, however, could be used as well.

The circumferential outer surface of the conveying belt 111 serves as shuttle contact surface 1111 to contact the conveying belt contact surface 311 of a shuttle 3 as explained before. For coupling a shuttle 3 with the conveying belt 111 by way of ferromagnetic forces, the conveying belt 111 comprises a magnetizable member 1112 (see also FIG. 9).

To ensure good coupling and force/torque transfer without slip, the first pulley 112a as well as the circumferential inner surface (not referenced) of the conveying belt 111 are toothed. Favorably, the conveying belt 111 comprises on its circumferential inner side a centering structure, e.g. a number of e.g. one or two wedge-shaped circumferential key slot(s) or circumferential rims. The first pulley 112a and/or second pulley 112b comprise a corresponding counter-centering structure, e.g. in form corresponding wedge-shaped circumferential protrusions respectively grooves to engage the key-slot(s) or rim(s) of the conveying belt 111. Thereby, self-centering of the conveying belt 111 is ensured. The expression "wedge-shaped" refers to a wedge-shaped cross section.

Parallel to the longitudinal conveying module axis 11c, a prismatic guide rail 114 with exemplarily two prismatic grooves 1141 extends on one side of the conveying belt 111. In operation, guide pulleys 33 of a shuttle 3 (see FIG. 8) engage the prismatic grooves 1141 in order to guide the shuttle 3 as explained before, such that the guide pulleys 33 run in the prismatic grooves 1141. Along the longitudinal conveying module axis 11c, the prismatic guide rail 114 extends over the complete conveying module length.

Further parallel to the longitudinal conveying module axis 11c, exemplarily two attraction bars 115 made from steel are arranged and extend between the conveying belt 111 and the prismatic guide rail 114. The attraction bars 115 extend substantially over the complete conveying module length. As explained before, the attraction bars 115 are arranged such that their shuttle-facing attraction bar surface 1151 is parallel to the shuttle contact surface 1111 of the conveying belt 111, but somewhat set back, e.a. away from the shuttle 3, such that a gap exists between the shuttle facing attraction bar surface 1151 and the conveying belt contact surface 311 (see FIG. 5a-d) of the shuttle 3 when the shuttle contact surface 1111 of the conveying belt 111 contacts the conveying belt contact surface 311 of the shuttle 3, the guide pulleys 33 run in the prismatic grooves 1141, and the support pulleys 34 (see FIG. 5a-d) run on a support surface 1161.

Further, parallel to the longitudinal conveying module axis 11c a support member 116 is arranged (in FIG. 6 only) and extends parallel to the conveying belt 111. In the shown design, the support member 116 is realized by a U-shaped sheet metal on the opposite side of the conveying belt 111. An outer surface of a leg serves as support surface 1161 and contacts, in operation, the support pulleys 34 of a shuttle 3. The support surface 1161 is arranged parallel to the shuttle contact surface 1111. The support member 116 extends substantially over the complete conveying module length. In operation, the support pulleys 34 of a shuttle 3 run on the support surface 1161.

Figure 8:
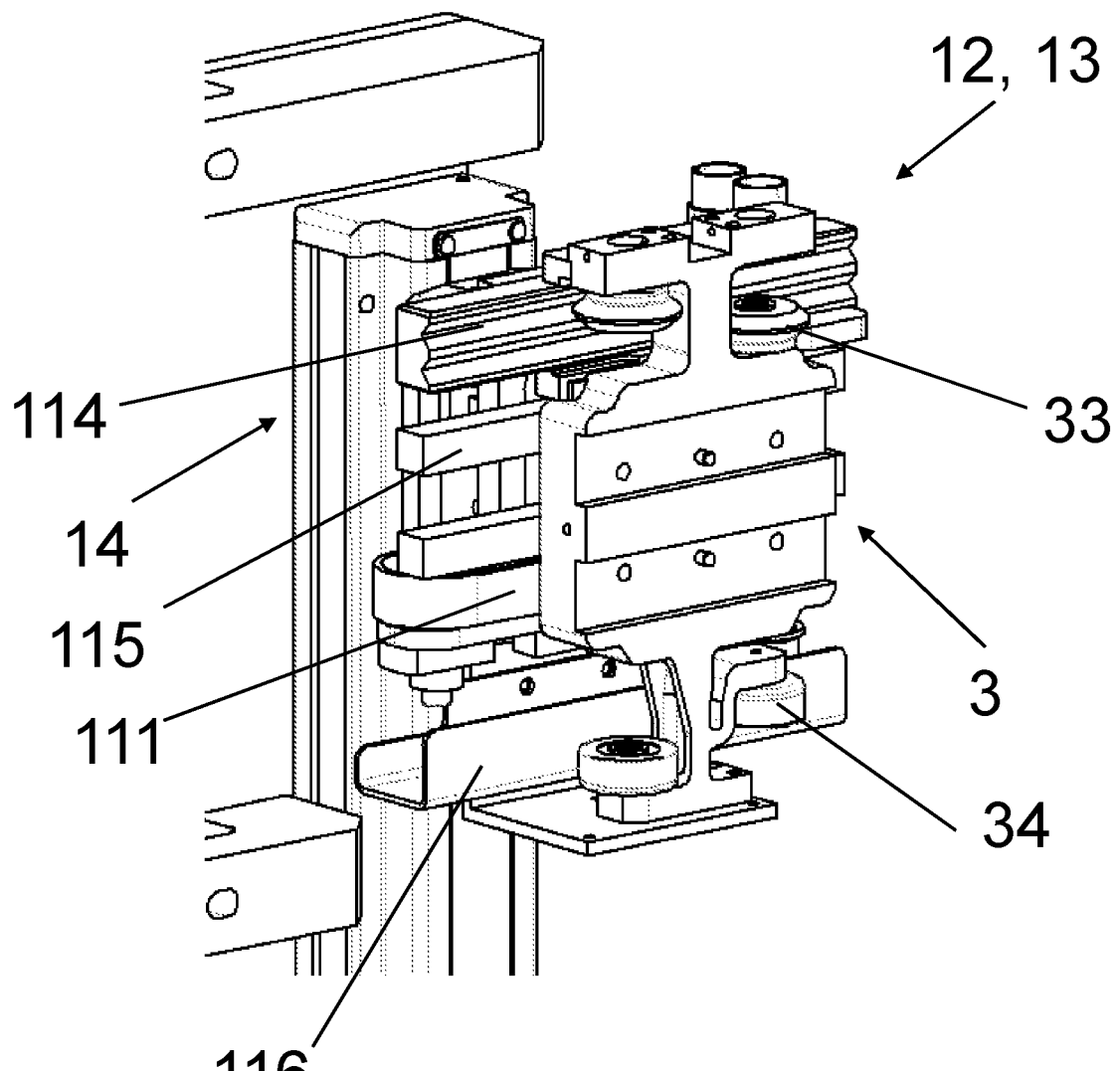
FIG. 8 shows a shuttle conveying module combination in a perspective view.

FIG. 8 illustrates a shuttle conveying module combination with a shuttle 3 and a shiftable conveying module 12, 13 in a perspective view. By way of example, the conveying module is one of the shiftable end conveying modules 12, 13 and is coupled to a shifting unit 14. However, the conveying module may also be a general conveying module 11 of the core conveying line 16.

Figure 9:
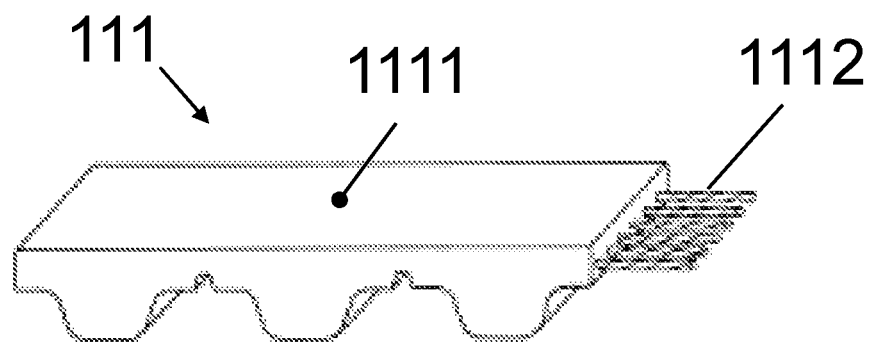
FIG. 9 shows a section of a conveying belt.

FIG. 9 shows a section of a conveying belt 111 according to an exemplary design in perspective view. The conveying belt 111 comprises a magnetizable member as counter-magnetic member 1112 in form of a number of flexible steel wires or flexible steel tie beams that are arranged parallel to each other and distributed over the width of the conveying belt 111. The steel wires or steel rod bars 1112 are embedded in an elastic base material (not referenced) of the conveying belt 111. It can further have seen that the conveying the shuttle contact surface 1111 of the conveying belt 111 is substantially unstructured respectively flat, while the opposed side (not referenced) is toothed for engagement with first and/or second pulley.

Figure 10:
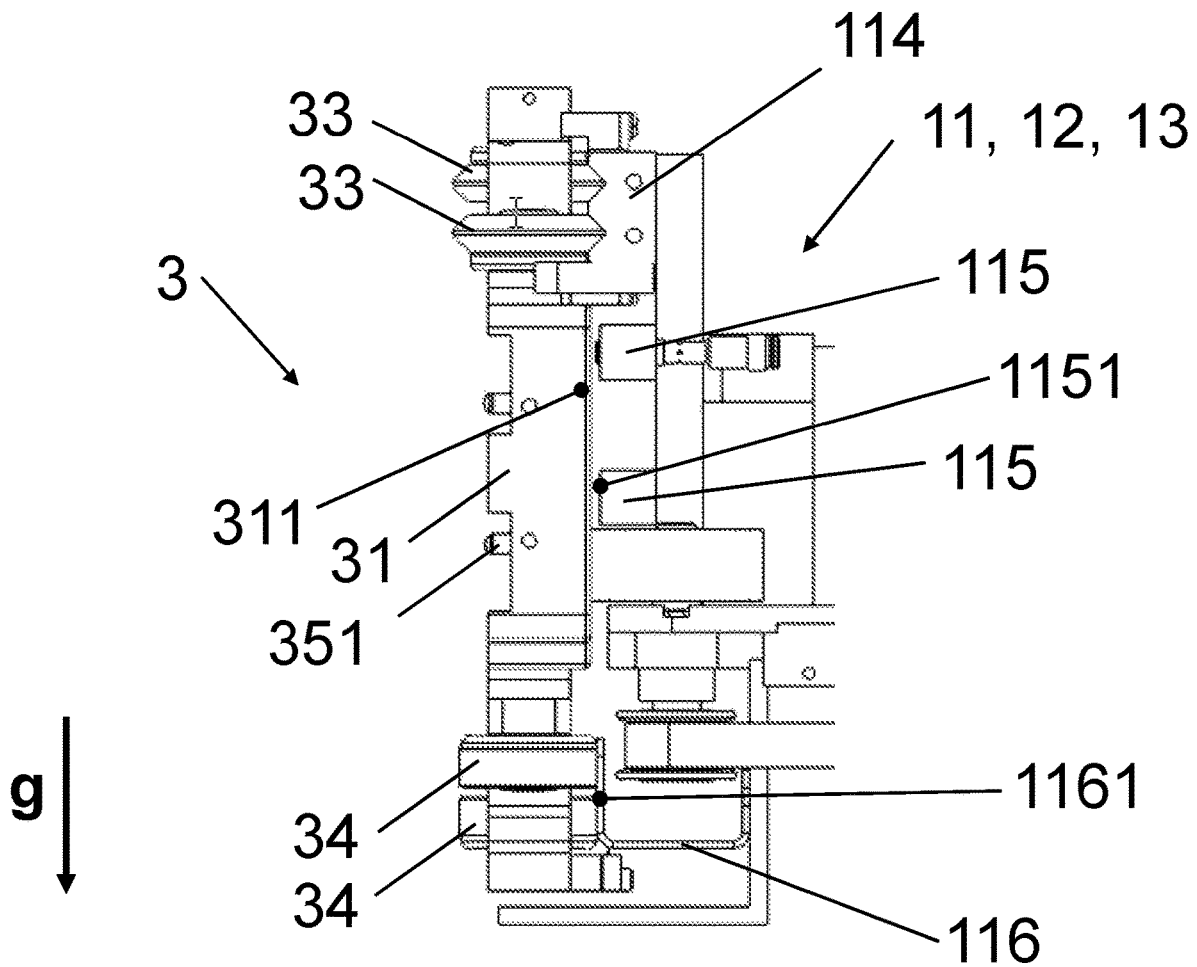
FIG. 10 shows a shuttle conveying module combination in a viewing direction aligned with the conveying directions.

FIG. 10 shows a shuttle conveying module combination, with a shuttle 3 and a conveying module which may be a general conveying module 11 or an end conveying module 12, 13 with a viewing direction that is aligned with, respectively arranged in parallel, to the convening direction CD, i.e. a viewing direction along the conveying belt 111. It can be seen that the support pulleys 34 contact and run on the support surface 1161 of support member 116, realized in this embodiment as profile rail of U-shaped cross section. The guide pulleys 33 run in the prismatic grooves (not referenced) of the prismatic guide rail 114. Further, it is visible that the shuttle-facing attraction bar surfaces 1151 of the exemplary two attraction bars 115 do not directly touch respectively contact the conveying belt contact surface 311 of the shuttle 3, but are spaced apart from the latter by a gap. (It is noted that the conveying belt 111 as such is not shown for clarity reasons in this view).

Figure 11:
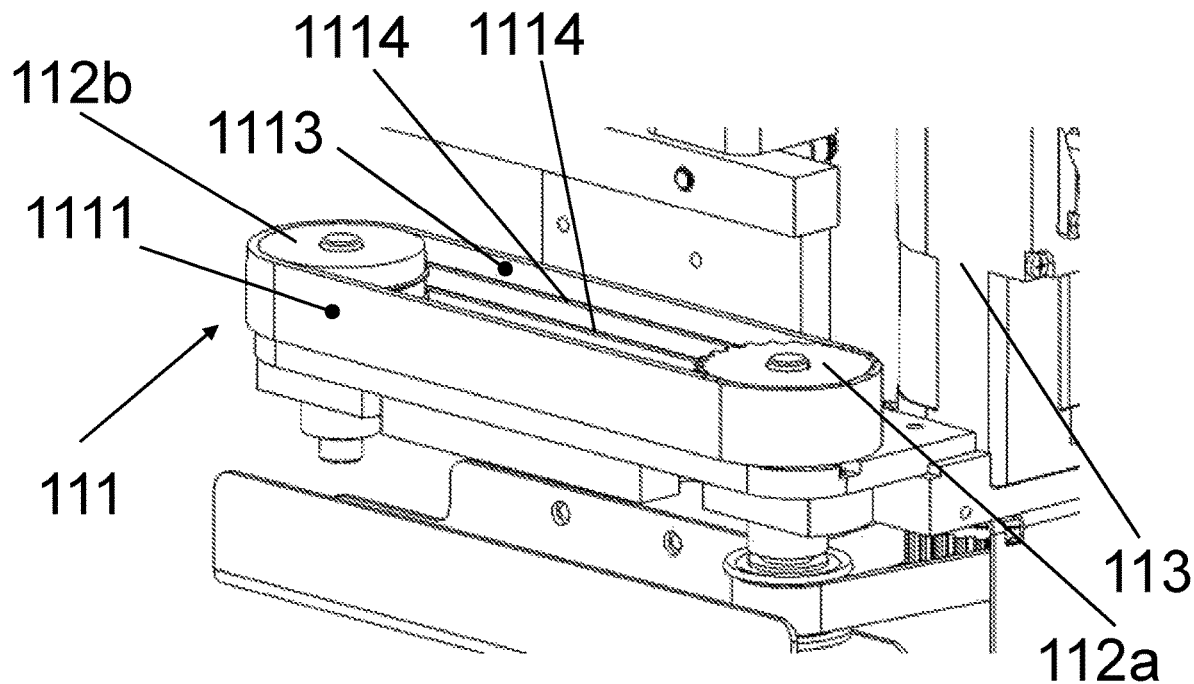
FIG. 11 shows a detail of a shuttle conveying module combination in a perspective view.
Figure 12:
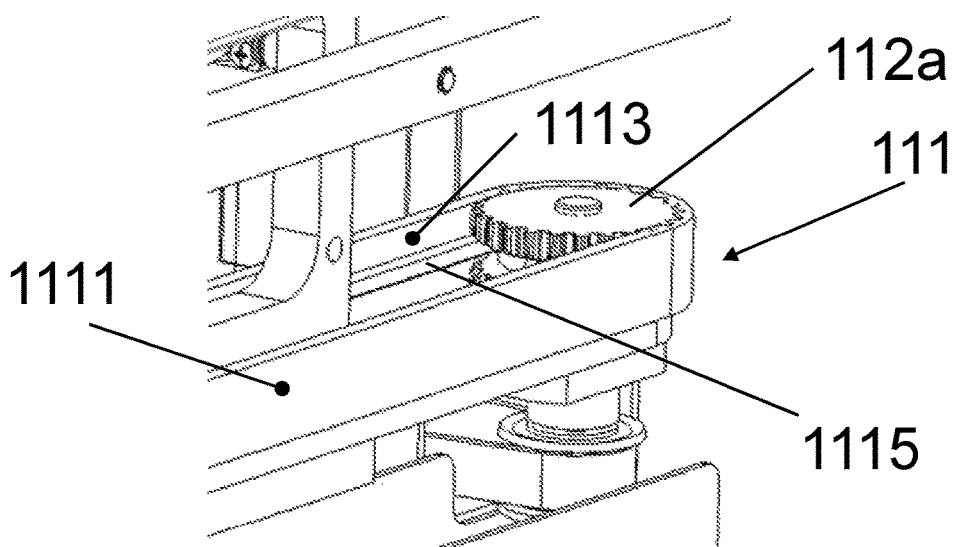
FIG. 12 shows a detail of a further shuttle conveying module combination in a perspective view.

FIG. 11 and FIG. 12 show two exemplary variants for centering the conveying belt 111 of a conveying module 11. In the design of FIG. 11, the conveying belt 111 comprises exemplary two favorably wedge-shaped circumferential grooves 1114 as centering structure that extend parallel to each other on the inner side respectively conveying belt inner side 1113. As counter centering structure, either of both of the first and second pulley 112a, 112b comprise corresponding circumferential grooves (not referenced). In the design of FIG. 12, the centering structure is realized by exemplarily one wedge shaped circumferential protrusion 1115 on the conveying belt inner side 1113, and either of both of the first and second pulley 112a, 112b comprise a corresponding circumferential groove (not referenced) as counter centering structure.

In the following, reference is additionally made to FIG. 13, FIG. 14, FIG. 15 and FIG. 16, illustrating an embodiment of an assembly system with a first and second shuttle stepper. Apart from the specific aspects as discussed in the following in more detail, the assembly system 9 may in general correspond to the before-described embodiments.

Figure 13:
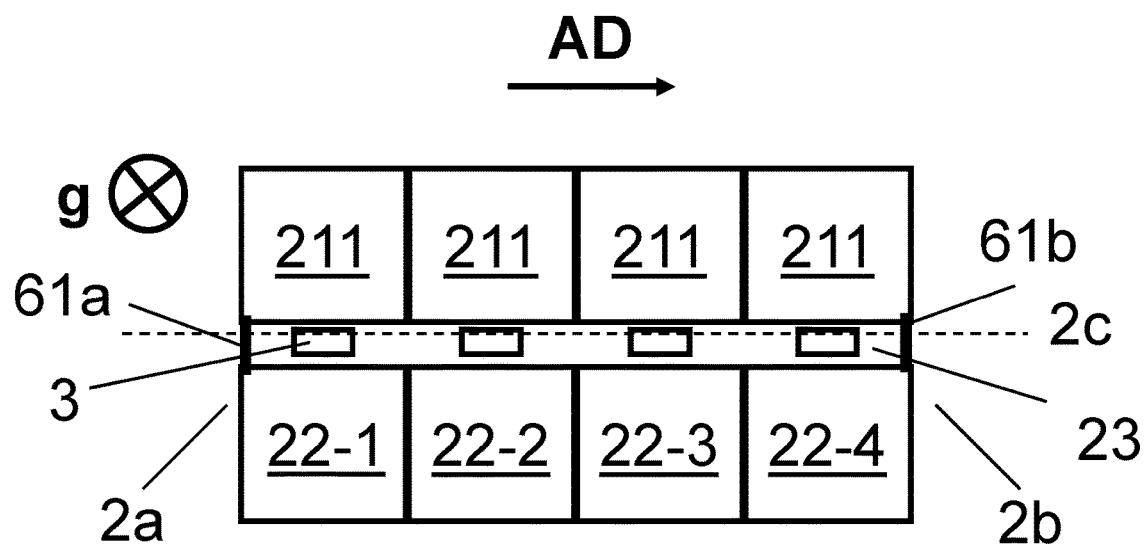
FIG. 13 schematically shows the geometric arrangement of the assembly line drive modules and associated assembly stations of a further embodiment of an assembly system with first and second assembly line shuttle stoppers.
Figure 14:
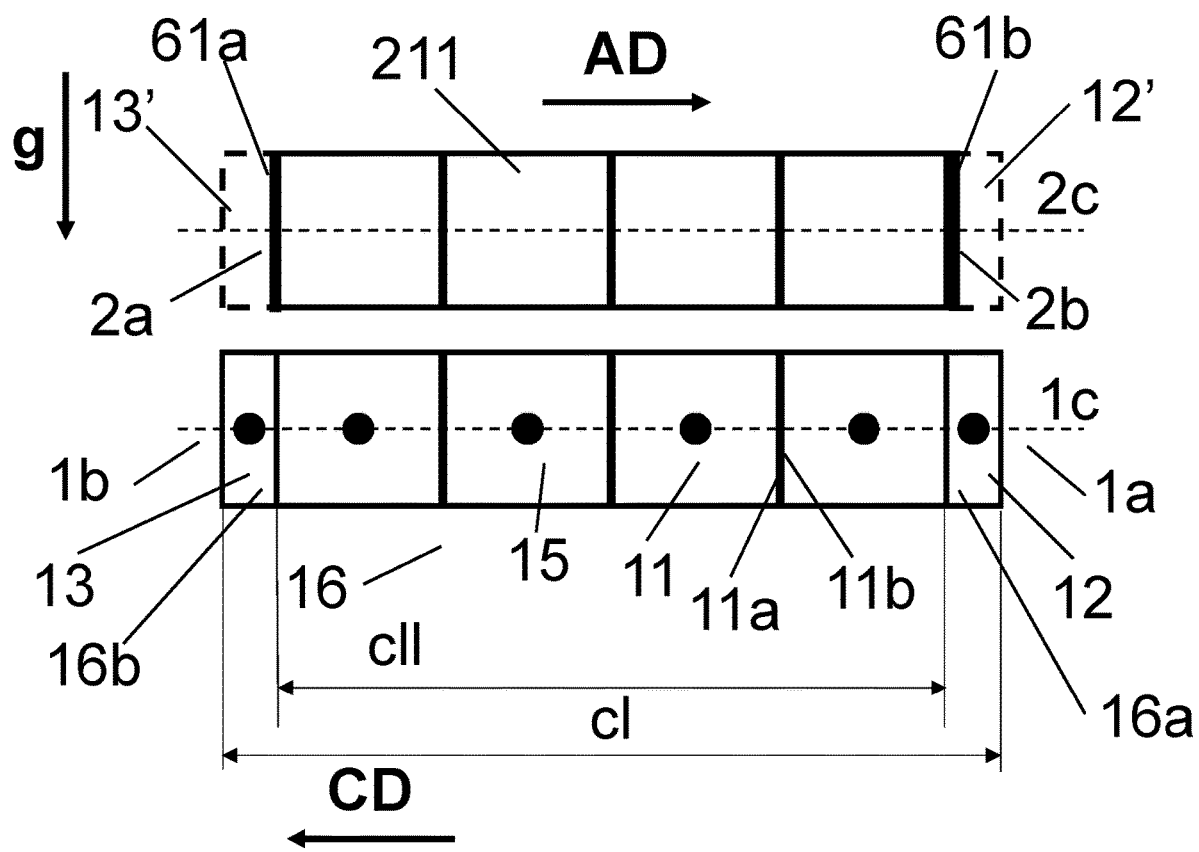
FIG. 14 schematically shows the geometric arrangement of assembly line drive modules and conveying modules of an embodiment of an assembly system pursuant to FIG. 13.

FIG. 13 respectively FIG. 14 are similar to FIG. 2 respectively FIG. 3 as discussed before. As best visible in the top view of FIG. 13, a first assembly line blocking structure 61a is arranged at the first assembly line end 2a and a second assembly line blocking structure 61b is arranged at the second assembly line end 2b. The first assembly line blocking structurer 61a and the second assembly line blocking structure 61b are in each case vertically movable between their respective blocking configuration and releasing configuration as discussed further below in more detail. As best visible in combination with FIG. 14 (schematically showing the first assembly line blocking structure 61a and the second assembly line blocking structure 61b in their respective blocking configuration), the first assembly line blocking structure 61a is longitudinally arranged at the interface of the first assembly line end 2a and the second shiftable end conveying module 13 in its offset configuration 13'. Similarly, the second assembly line blocking structure 61b is longitudinally arranged at the interface of the second assembly line end 61b and the first shiftable end conveying module 12 in its offset configuration 12'. In the blocking configuration of the first assembly line blocking structure 61a, a shuttle 3 can accordingly not enter or exit the assembly line shuttle conveying room 23 at the first assembly line end 2a. Similarly, In the blocking configuration of the second assembly line blocking structure 61b, a shuttle 3 can accordingly not enter or exit the assembly line shuttle conveying room 23 at the second assembly line end 2b. A transfer to or from either of the shiftable end conveying modules 12, 13 is only possible if the respective blocking structure 61a, 61b is in its respective releasing configuration.

Figure 15:
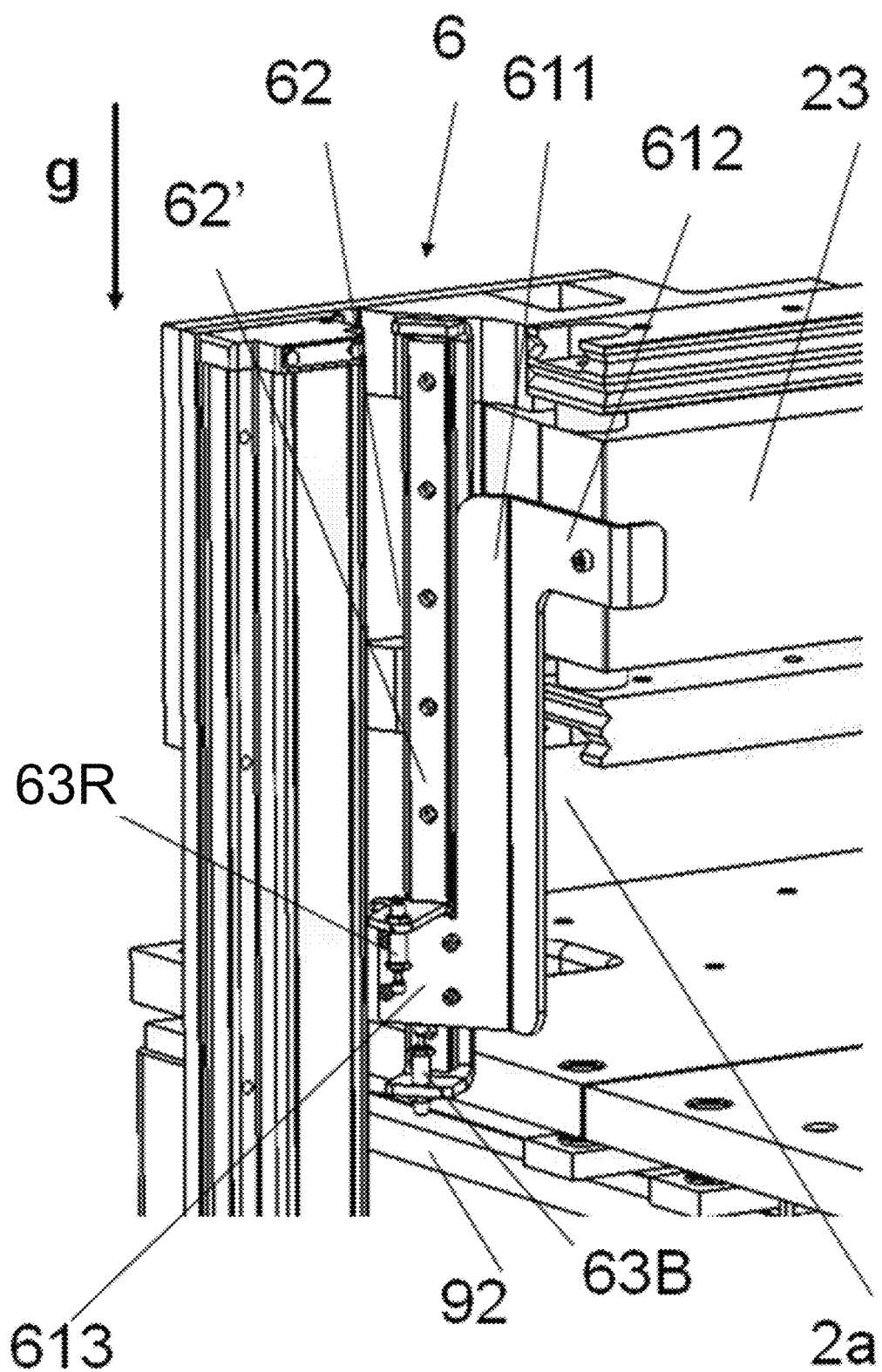
FIG. 15 shows an assembly line shuttle stopper and further components with the blocking structure of the assembly line shuttle stopper being in the blocking configuration.

FIG. 15 shows an assembly line shuttle stopper 6 with the assembly line blocking structure 61 (referenced in FIG. 16) being in the blocking configuration. In the shown arrangement, the assembly line shuttle stopper 6 is a first assembly line shuttle stopper and is arranged at the first assembly line end 2a. The second assembly line shuttle stopper, however, is realized in the same manner but arranged at the second assembly line end 2b as explained before. The assembly line shuttle stopper 6 includes an assembly line shuttle stopper linear guide 62 with a guide rail 62' that is mounted to the frame structure respectively base 92 of the assembly system 9 such that a longitudinal guide rail axis is vertical. The linear guide 62 further includes a runner that is movable along the in this case vertical guide rail axis in a guided manner.

The assembly line blocking structure 61 is in the shown design exemplarily formed from sheet metal. The assembly line blocking structure 61 exemplarily includes an elongated assembly line blocking structure body 611, an assembly line blocking part 612 and an assembly line blocking structure base 613. The elongated assembly line blocking structure body 611 extends generally in vertical direction. The assembly line blocking structure base 613 forms a lower part of the assembly line blocking structure 61 and is mounted to the runner of the assembly line shuttle stopper linear guide 62, such that the assembly line blocking structurer 61 and the runner may move together along the vertical guide rail axis. It is noted that the runner is as such not visible but hidden by the assembly line blocking structure base 613. At its upper side, the assembly line blocking structure 61 comprises an assembly line blocking part 612 that projects from the assembly line blocking structure body 611 and blocks the assembly line shuttle conveying room 23 at the first assembly line end 2a in the blocking configuration of FIG. 15.

The blocking configuration as shown in FIG. 15 corresponds to the lowermost position of the runner and the assembly line blocking structure 61 which is automatically assumed due to the gravitational force acting on the runner and the assembly line blocking structure 61. As the runner with the assembly line blocking structure 61 moves into the blocking configuration, the runner and/or the assembly line blocking structure base 613 hits in the shown design an optional blocking damper 63B, e.g. a spring-based damper, that is mounted to the frame structure respectively base 92 of the assembly system 9 and rests thereon in the blocking configuration. It is noted that in the blocking configuration as shown in FIG. 15, the (second) shiftable end conveying module 13 is below the shown part of the assembly system 9 and accordingly not visible.

Figure 16:
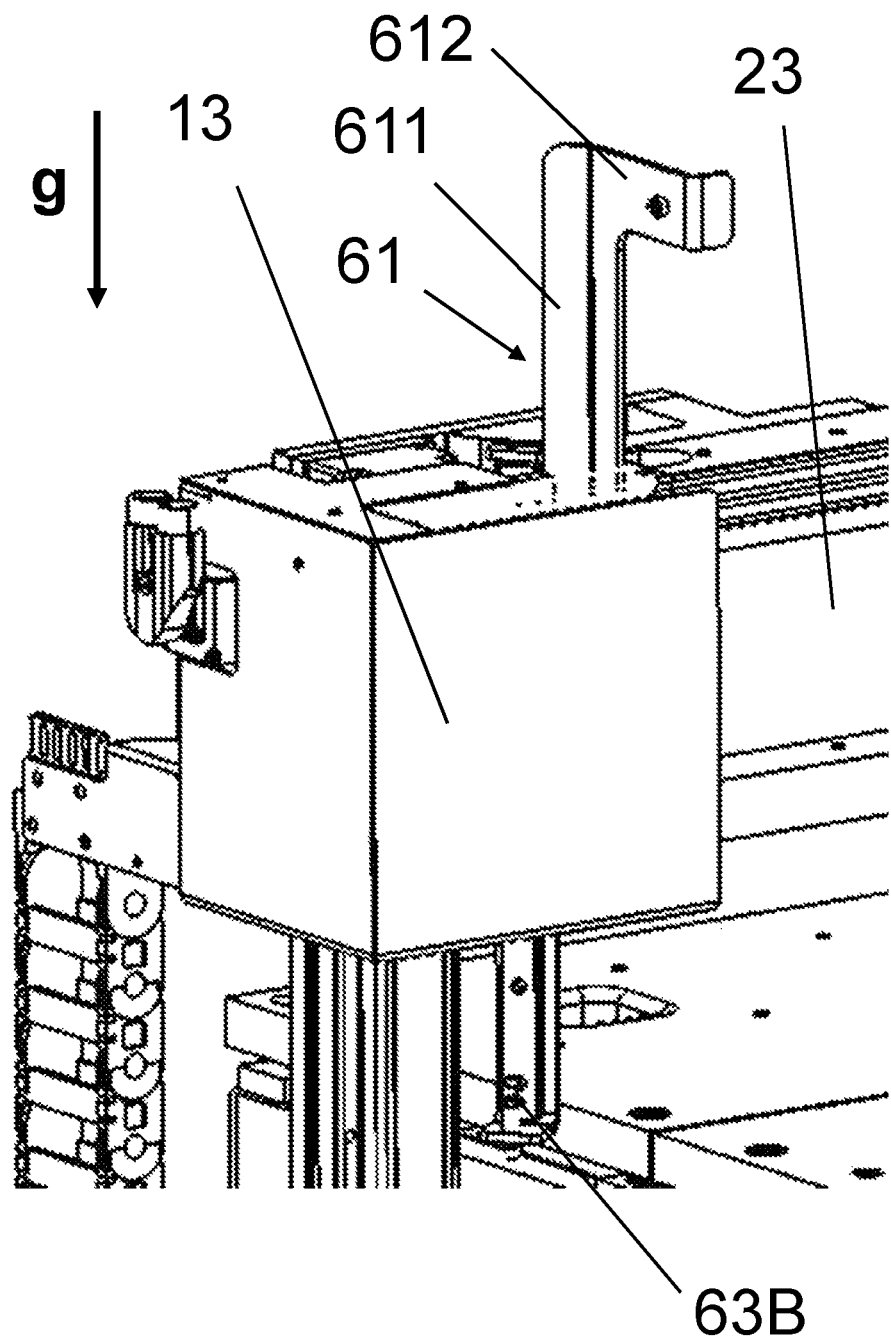
FIG. 16 shows an assembly line shuttle stopper and further components of an assembly line with the blocking structure of the assembly line shuttle stopper being in the releasing configuration.

As the (second) shiftable end conveying module 13 starts to move upwards from its aligned configuration (in alignment with core conveying line 16 as explained before) into its offset configuration (in alignment with the assembly line drive unit as explained before), the (second) shiftable end conveying module 13 will at some point hit a releasing damper 63R that is optionally arranged at and mounted to the assembly line blocking structure base 613. When moving further upwards, the runner and the assembly line blocking structure 61 are accordingly lifted and move together with the (second) shiftable end conveying module 13. In the offset configuration 13' of the (second) shiftable end conveying module 13, the assembly line blocking structure 61 assumes its blocking configuration respectively upper end position, as shown in FIG. 16. While being lifted and subsequently resting on the (second) shiftable end conveying module 13, the assembly line blocking structure 61 is connected with the (second) shiftable end conveying module 13 via the releasing damper 63R and is supported thereby against gravity.

As the (second) shiftable end conveying module 13 moves again downwards toward its aligned configuration, the assembly line blocking structure 61 will first follow this movement, with the assembly line blocking structure 61 being further connected with the (second) shiftable end conveying module 13 via the releasing damper 63R. The gravity-driven downwards movement of the runner and assembly line blocking structure 61 accordingly follows the (second) shiftable end conveying module 13. As the assembly line blocking structure base 613 respectively the runner hits the blocking damper 63B as explained before, contact with the (second) shiftable end conveying module 13 is lost. The runner and the assembly line blocking structure 61 accordingly rest on the blocking damper 63B and are maintained in the blocking configuration, while (second) shiftable end conveying module 13 continues its downwards movement into its aligned configuration.

In the release configuration of the assembly line blocking structure 61 as shown in FIG. 16, the assembly line blocking structure body 611 projects in vertical direction above the assembly line 2, with in particular the assembly line blocking part 612 being located above the assembly line 2. The assembly line shuttle convening room 23 is accordingly open to the (second) shiftable end conveying module 13, thereby enabling a shuttle transfer.

In the following, the arrangement and operation of a conveying line shuttle stopper 7 is illustrated with reference to FIG. 17 to FIG. 20.

Figure 17:
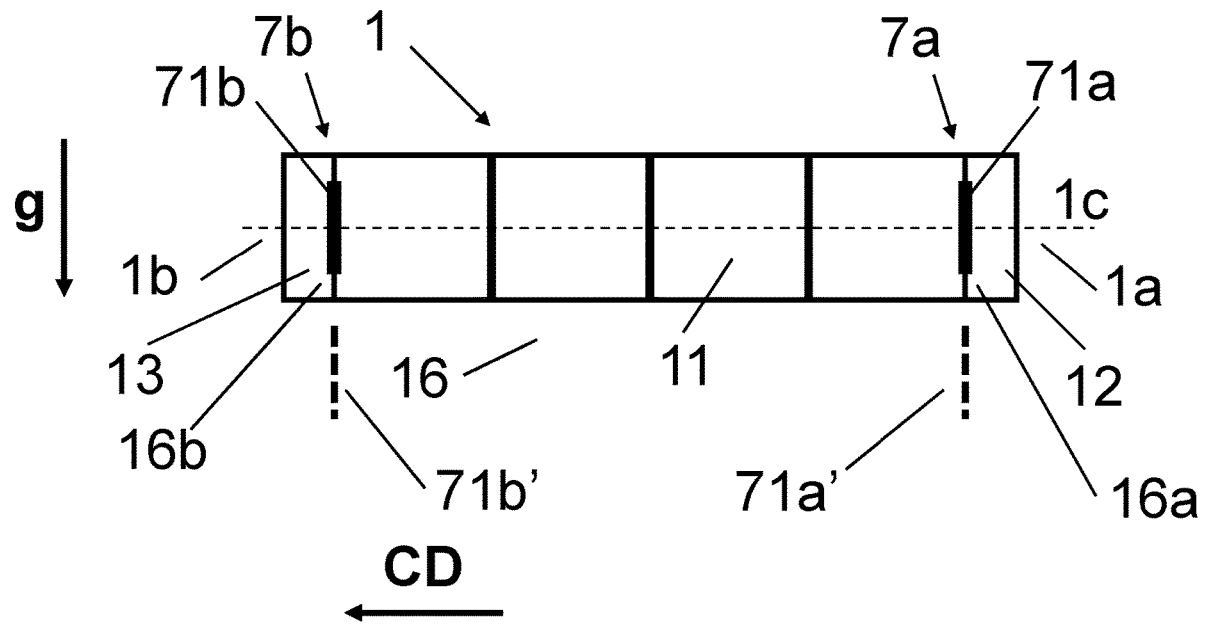
FIG. 17 schematically shows the geometric arrangement of a conveying line of a further embodiment of an assembly system with first and second conveying line shuttle stoppers.

FIG. 17 schematically illustrates the arrangement of a first conveying line shuttle stopper 7a with a first conveying line blocking structure 71a and a second conveying line shuttle stopper 7b with a second conveying line blocking structure 71b. The view of FIG. 17 generally corresponds to FIG. 3. The assembly line 2, however, is not shown for clarity reasons. The first conveying line blocking structure 71a is arranged at the first core conveying line end 16a respectively at the transition between the core conveying line 16 and the first shiftable end conveying module 12. Similarly, the second conveying line blocking structure 71b is arranged at the second core conveying line end 16b respectively at the transition between the core conveying line 16 and the second shiftable end conveying module 13. In the blocking configuration, the transfer of a shuttle 3 between the core conveying line 16 and the first 12 respectively second 13 shiftable end conveying module is blocked. In their respective releasing configuration (shown as 71a', respectively 71b'), the first 71a respectively second 71b conveying line blocking structure are vertically displaced with respect to the conveying line 1.

Figure 18:
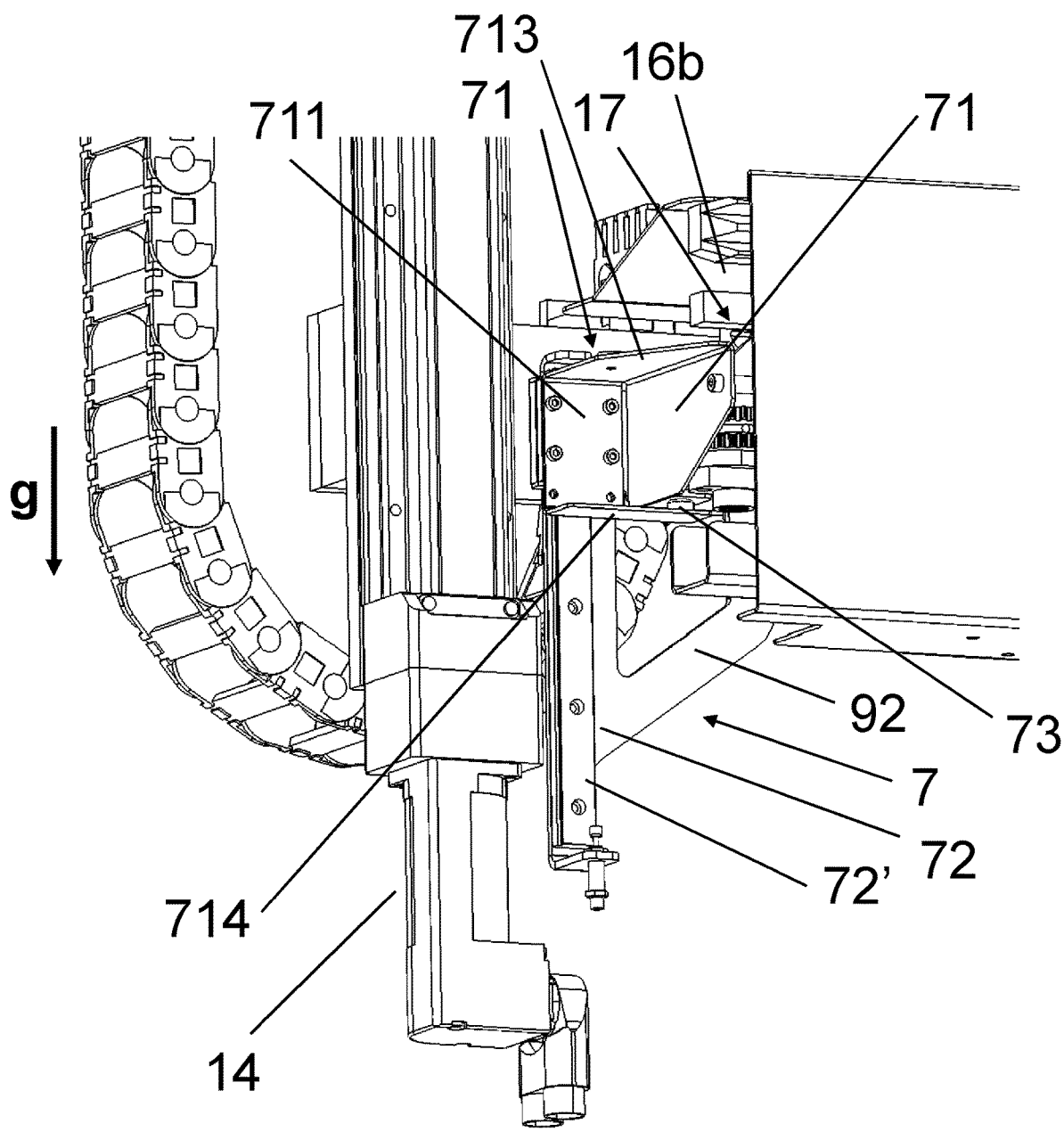
FIG. 18 shows a conveying line shuttle stopper and further components with the blocking structure of the conveying line shuttle stopper being in the blocking configuration.

FIG. 18 illustrates the arrangement of a conveying line shuttle stopper 7 in the blocking configuration of the conveying line blocking structure 71. In the shown arrangement, the conveying line shuttle stopper 7 is a second conveying line shuttle stopper 7b as illustrated in FIG. 17 and the conveying line blocking structure 71 corresponds to a second conveying line blocking structure 71b. The first assembly line shuttle stopper 7a that is arranged at the first core conveying line end 16a, however, is realized in the same manner.

The conveying line shuttle stopper 7 includes a conveying line shuttle stopper linear guide 72 with a guide rail 72' that is mounted to the frame structure respectively base 92 of the assembly system such that a longitudinal guide rail axis is vertical. The linear guide 72 further includes a runner that is movable along the in this case vertical guide rail axis in a guided manner. The conveying line blocking structure 71 is in the shown design exemplarily formed from sheet metal. The conveying line blocking structure 71 exemplarily includes a conveying line blocking part 712, a conveying line blocking structure top 713 and a conveying line blocking structure bottom 714. The conveying line blocking structure 71 further includes a conveying line blocking structure base 711 that extends in the shown design between the conveying line blocking structure top 713 and the conveying line blocking structure bottom 714 and is mounted to the runner of the conveying line shuttle stopper linear guide 72, such that the conveying line blocking structure 71 and the runner may move together along the vertical guide rail axis. It is noted that the runner is as such not visible but hidden by the conveying line blocking structure base 711. The conveying line blocking structure top 713, the conveying line blocking structure bottom 714 and the conveying line blocking part 712 are mounted to and project from the conveying line blocking structure base 711. In the shown blocking configuration, the conveying line blocking structure 71 blocks the core conveying line shuttle conveying room 17 of the core conveying line 16 at the second core conveying line end 16b. Further in the blocking configuration, the conveying line blocking structure 71 is magnetically locked in position by the conveying line locking magnet 73 attracting the in this design ferromagnetic conveying line blocking structure bottom 714. The conveying line locking magnet 73 is exemplarily a disk- or coin shaped magnet with a downwards-directed contact surface and is mounted to the frame structure respectively base 92. Thereby, the conveying line blocking structure 71 is held in position against gravity.

Figure 19:
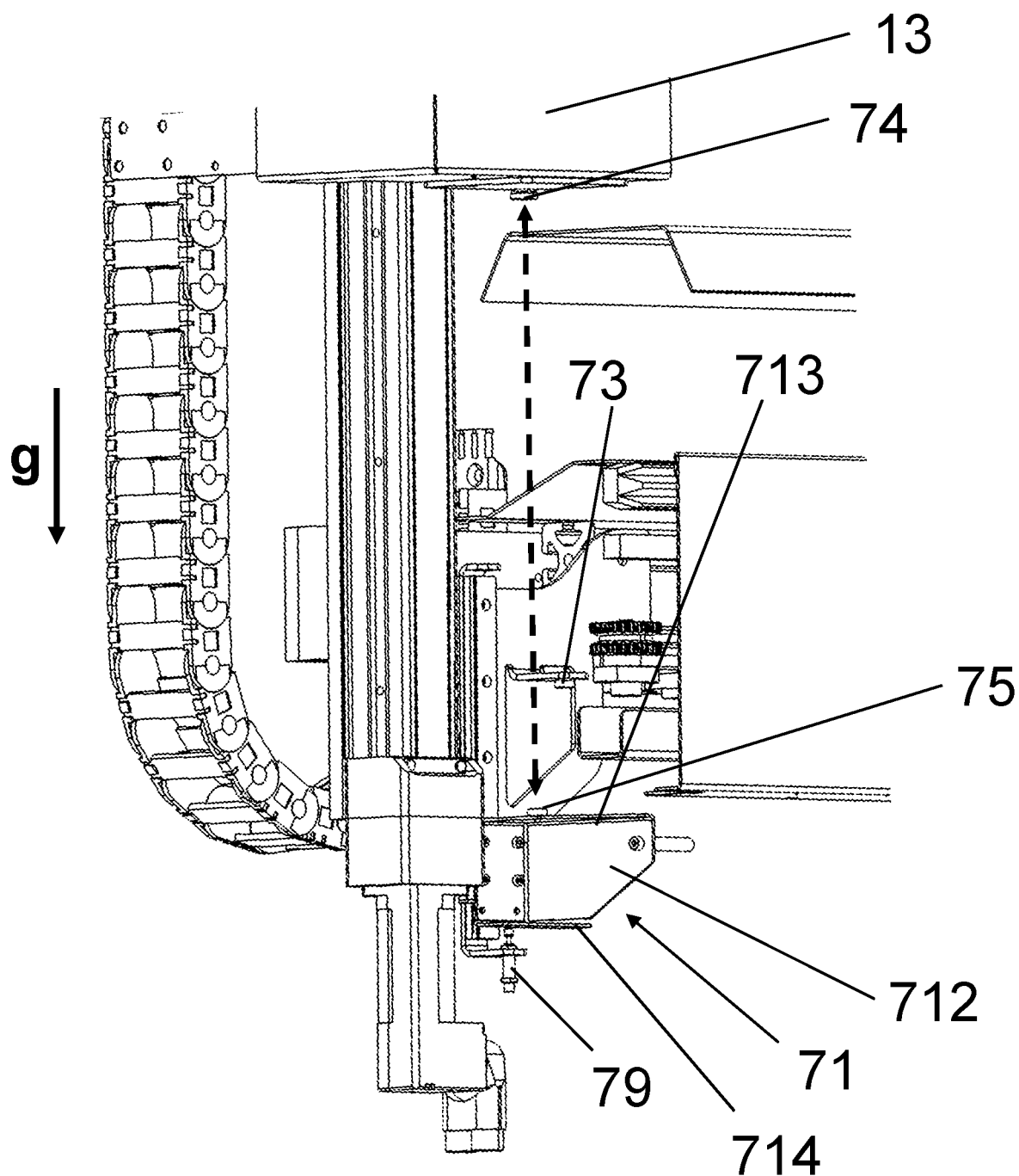
FIG. 19 shows a conveying line shuttle stopper and further components with the blocking structure of the conveying line shuttle stopper being in the releasing configuration.

FIG. 19 shows the conveying line blocking structure 71 in its releasing configuration, with the conveying line blocking structure bottom 714 resting on a damper 79 which may be generally of the same type as the blocking damper 63B and releasing damper 63R as mentioned before.

At the lower side respectively bottom side of the (second) shiftable end conveying module 13, an end conveying module locking magnet 74 with downwards-directed contact surface is provided. The end conveying module locking magnet 74 is arranged to magnetically couple with the conveying line blocking structure top 713. In the shown design, however, the conveying line blocking structure top 713, is like the conveying line blocking part 712 made from non-magnetic material, for example stainless steel sheet metal, in contrast to the ferromagnetic conveying line blocking structure bottom 714. In order to allow magnetic coupling with the end conveying module locking magnet 74, an auxiliary magnet 75 with upwards-facing contact surface is arranged at the conveying line blocking structure top 713. In the vertical direction, the end conveying module locking magnet 74 and the auxiliary magnet 75 are aligned with each other or at least overlap, thereby allowing a contact between the contact surfaces of the magnets.

It is noted that in FIG. 19 the conveying line blocking structure 71 is in its releasing configuration, while the (second) shiftable end conveying module 13 is displaced upwards, in order to illustrate the arrangement of the magnets. In application, however, such configuration does generally not occur. When a conveying line blocking structure 71 is in its lowermost respectively releasing configuration, the associated (second) shiftable end conveying module 13 is in its lowermost operational position, corresponding to the aligned configuration, and is magnetically coupled to the associated conveying line blocking structure, i.e. the end conveying module locking magnet 74 and the auxiliary magnet 75 contact each other.

Figure 20:
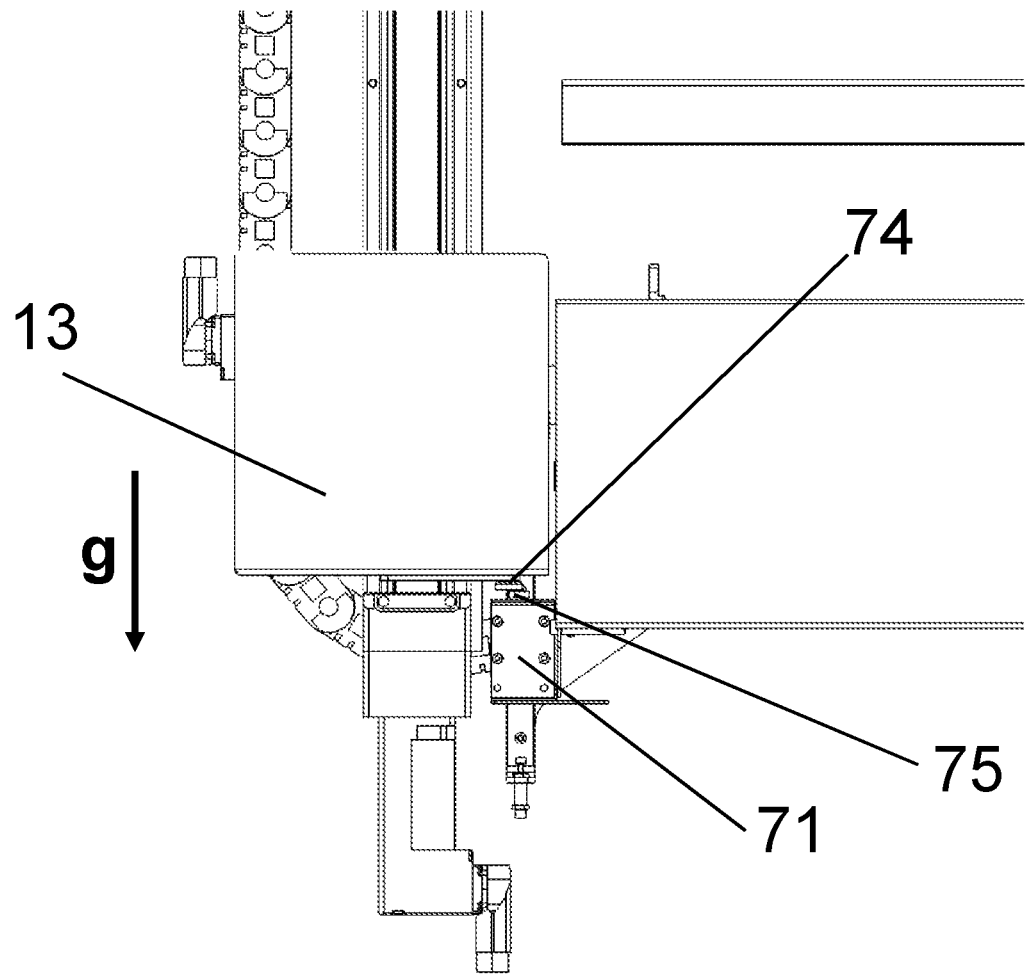
FIG. 20 shows a conveying line shuttle stopper and further components with the blocking structure of the conveying line shuttle stopper being in an intermediate position.

FIG. 20 illustrates in a front view a situation where the conveying line blocking structure 71 is magnetically locked to the (second) shiftable end conveying module 13 in an intermediate position between the blocking configuration (see FIG. 18) and the releasing configuration (see FIG. 19) of the conveying line blocking structure 71. It can be seen that the end conveying module locking magnet 74 and the auxiliary magnet 75 contact each other, thereby magnetically coupling and locking the conveying line blocking structure 71 to the (second) shiftable end conveying module 13. The magnetic coupling between the magnets 74, 75 is dimensioned to allow a safe magnetic attachment respectively locking of the conveying line blocking structure 71 to the (second) shiftable end conveying module 13 against gravity.

It is noted that the first 61a and second 61b assembly line blocking structure are structurally and functionally independent form each other. Similarly, the first 71a and second 71b conveying line blocking structure are functionally independent from each other. Therefore, an assembly system 9 may in principle only include one of the first 61a or second 61b assembly line blocking structure respectively one of the first 71a and second 71b conveying line blocking structure. Further, while both assembly line blocking structures 61 as well as conveying line blocking structures 71 are typically present, this is not essential.

| REFERENCE SIGNS | |
|---|---|
| 1 | conveying line |
| 1a | first conveying line end |
| 1b | second conveying line end |
| 1c | conveying line axis |
| 11 | conveying module |
| 11a | first conveying module end |
| 11b | second conveying module end |
| 11c | longitudinal conveying module axis |
| 111 | conveying belt |
| 1111 | shuttle contact surface |
| 1112 | counter-magnetic member/magnetizable member/steel inlay |
| 1113 | conveying belt inner side |
| 1114 | centering structure (circumferential groove) |
| 1115 | centering structure (circumferential protrusion) |
| 112a, b | first and second pulley |
| 113 | drive/motor |
| 114 | prismatic guide rail |
| 1141 | prismatic groove |
| 115 | attraction bar |
| 1151 | shuttle-facing attraction bar surface |
| 116 | support member |
| 1161 | support surface |
| 12 | first shiftable end conveying module |
| 12' | offset configuration of first shiftable end conveying module |
| 13 | second shiftable end conveying module |
| 13' | offset configuration of second shiftable end conveying module |
| 14 | shifting unit/spindle drive |
| 15 | shuttle detector |
| 16 | core conveying line |
| 16a | first core conveying line end |
| 16b | second core conveying line end |
| 17 | core conveying line shuttle conveying room |
| 2 | assembly line |
| 2a | first assembly line end |
| 2b | second assembly line end |
| 2c | assembly line axis |
| 21 | assembly line drive unit |
| 211 | assembly line drive module |
| 22-1, 22-2, 22-3, 22-4 | assembly station |
| 23 | assembly line shuttle conveying room |
| 3 | shuttle |
| 3c | longitudinal shuttle axis |
| 31 | shuttle body |
| 311 | conveying belt contact surface |
| 32 | magnetic member/permanent magnet |
| 33 | guide pulley |
| 34 | support pulley |

-continued

| REFERENCE SIGNS | |
|---|---|
| 35 | product holder coupling structure/product interface |
| 351 | locating pin |
| 352 | threaded hole |
| 353 | key |
| 4 | control unit |
| 5 | overall control system |
| 6 | assembly line shuttle stopper |
| 6a | first assembly line shuttle stopper |
| 6b | second assembly line shuttle stopper |
| 61 | assembly line blocking structure |
| 61a | first assembly line blocking structure |
| 61b | second assembly line blocking structure |
| 611 | assembly line blocking structure body |
| 612 | assembly line blocking part |
| 613 | assembly line blocking structure base |
| 62 | assembly line shuttle stopper linear guide |
| 62' | guide rail |
| 63B | blocking damper |
| 63R | releasing damper |
| 7 | conveying line shuttle stopper |
| 7a | first conveying line shuttle stopper |
| 7b | second conveying line shuttle stopper |
| 71 | conveying line blocking structure |
| 71a | first conveying line blocking structure |
| 71a' | first conveying line blocking structure (releasing configuration) |
| 71b | second conveying line blocking structure |
| 71b' | second conveying line blocking structure (releasing configuration) |
| 711 | conveying line blocking structure base |
| 712 | conveying line blocking part |
| 713 | conveying line blocking structure top |
| 714 | conveying line blocking structure bottom |
| 72 | conveying line shuttle stopper linear guide |
| 72' | guide rail |
| 73 | conveying line locking magnet |
| 74 | end conveying module locking magnet |
| 75 | auxiliary magnet |
| 79 | damper |
| 9 | assembly system |
| 91 | assembly system module |
| 911 | platform element |
| 92 | frame structure/base |
| g | direction of gravity (vertical direction) |
| AD | assembly direction |
| CD | conveying direction |
| cl | conveying line length |
| cll | core conveying line length |

The invention claimed is:

1. A conveying system, the conveying system including a conveying line and a number of shuttles;
the conveying line having a first conveying line end and an opposed second conveying line end and a longitudinal conveying line axis extending between the first conveying line end and the second conveying line end, the conveying line including a number of conveying modules, wherein each conveying module includes:
a circumferentially closed conveying belt, the conveying belt generally extending in parallel with the longitudinal conveying line axis, wherein the conveying belt includes a counter-magnetic member the counter-magnetic member extending substantially along a whole circumference of the conveying belt; and
a drive in operative coupling with the conveying belt to drive the conveying belt with a circumferential speed;
and wherein each shuttle includes:
a product interface for operatively coupling with a product to be conveyed; and
a magnetic member;

wherein each shuttle and each conveying module may be temporarily associated with each other to establish a shuttle conveying module combination, wherein, in a shuttle conveying module combination, the magnetic member of the shuttle and the counter-magnetic member of the conveying belt of the conveying module interact by way of ferromagnetic forces, thereby releasably coupling the shuttle to the conveying belt of the conveying module; and wherein each conveying module includes a magnetizable attraction bar, the magnetizable attraction bar extending parallel to the longitudinal conveying line axis and in parallel with the conveying belt of the respective conveying module, wherein the magnetizable attraction bar of each conveying module is arranged such that, in a shuttle conveying module combination, the magnetic member of the shuttle is attracted by the magnetizable attraction bar of the conveying module by way of ferromagnetic forces.

2. The conveying system according to claim 1, wherein each shuttle includes a generally planar conveying belt contact surface, wherein the magnetic member is arranged at or in proximity of the conveying belt contact surface of the respective shuttle.

3. The conveying system according to claim 1, wherein each conveying module includes a prismatic guide rail, the prismatic guide rail extending parallel to the longitudinal conveying line axis and in parallel with the conveying belt of the respective conveying module; and wherein each shuttle includes a number of guide pulleys, wherein the guide pulleys are arranged to engage, in a shuttle conveying module combination, the prismatic guide rail of the respective conveying module.

4. The conveying system according to claim 1, the conveying system further including a number of shuttle detectors, each shuttle detector being arranged at an associated shuttle detector position, wherein each shuttle detector is configured to detect a presence of a shuttle of the number of shuttles at its associated shuttle detector position.

5. The conveying system according to claim 1, wherein the counter-magnetic member of the conveying belt of each conveying module is a steel inlay, the steel inlay being embedded in an elastic base material of the conveying belt of the respective conveying module.

6. The conveying system according to claim 1, wherein the longitudinal conveying line axis is traverse to a direction of gravity.

7. The conveying system according to claim 1, wherein a group of conveying modules of the number of conveying modules are arranged one after the other along the longitudinal conveying line axis and are aligned with each other, thereby forming a core conveying line, the core conveying line extending between a first core conveying line end and a second core conveying line end.

8. The conveying system according to claim 7, further including a first shiftable end conveying module and a second shiftable end conveying module, wherein the first shiftable end conveying module extends from the first core conveying line end towards the first conveying line end and the second shiftable end conveying module extends from the second core conveying line end to the second conveying line end;

wherein the first shiftable end conveying module and the second shiftable end conveying module are each shiftable between an aligned configuration where the first shiftable end conveying module respectively the second shiftable end conveying module is aligned with an associated neighboring conveying module of the core conveying line, and an offset configuration where the first shiftable end conveying module respectively the second shiftable end conveying module is offset from the associated neighboring conveying module of the core conveying line in a direction traverse to the longitudinal conveying line axis;

wherein, in the aligned configuration of the first shiftable end conveying module respectively the second shiftable end conveying module, a shuttle of the number of shuttles is enabled to be transferred between the first shiftable end conveying module respectively the second shiftable end conveying module and the associated neighboring conveying module of the core conveying line.

9. The conveying system according to claim 8, wherein a conveying direction of the first shiftable end conveying module and a conveying direction of the second shiftable end conveying module are reversible.

10. The conveying system according to claim 8, wherein the first shiftable end conveying module and the second shiftable end conveying module are each operatively coupled with an associated shifting unit for shifting the first shiftable end conveying module respectively the second shiftable end conveying module between its aligned configuration and its offset configuration.

11. The conveying system according to claim 8, wherein a shifting direction between the aligned configuration and the offset configuration of the first shiftable end conveying module respectively the second shiftable end conveying module is aligned with the direction of gravity.

12. An assembly system, including:
a conveying system according to claim 11,
an assembly line, the assembly line having a first assembly line end and an opposed second assembly line end and a longitudinal assembly line axis extending between the first assembly line end and the second assembly line end, the assembly line including:
a number of assembly stations, wherein each assembly station is designed to execute an associated dedicated assembly step in the assembly of a product with the product being coupled to a shuttle, wherein the assembly stations are sequentially arranged along the assembly line axis, wherein the assembly line axis is parallel to the conveying line axis and vertically displaced with respect to the conveying line axis; and
an assembly line drive unit, the assembly line drive unit being arranged to convey a shuttle in an assembly direction along the assembly line axis such that the shuttle passes the assembly stations one after the other;
wherein, in the offset configuration of the first shiftable end conveying module, the conveying belt of the first shiftable end conveying module is aligned with the assembly line drive unit, thereby enabling a shuttle of the number of shuttles to be transferred from the assembly line to the first shiftable end conveying module;
wherein, in the offset configuration of the second shiftable end conveying module, the conveying belt of the second shiftable end conveying module is aligned with the assembly line drive unit, thereby enabling a shuttle of the number of shuttles to be transferred from the second shiftable end conveying module to the assembly line.

13. The assembly system according to claim 12, wherein the assembly line drive unit includes an electromagnetic coil arrangement, the electromagnetic coil arrangement forming a linear motor stator and extending along the assembly line axis, the electromagnetic coil arrangement being arranged and controllable to convey a shuttle of the number of shuttles along the assembly line axis via magnetic forces between the electromagnetic coil arrangement and the magnetic member of the shuttle.

14. The assembly system according to claim 12, the assembly system including a first assembly line shuttle stopper and a second assembly line shuttle stopper, wherein the first assembly line shuttle stopper includes a first assembly line blocking structure and the second assembly line shuttle stopper includes a second assembly line blocking structure, wherein the first assembly line blocking structure and the second assembly line blocking structure are each arranged movable between a respective releasing configuration and an alternative respective blocking configuration,
wherein an assembly line shuttle conveying room is blocked at the first assembly line end by the first assembly line blocking structure in the blocking configuration of the first assembly line blocking structure and is released in the releasing configuration of the first assembly line blocking structure, and
wherein the assembly line shuttle conveying room is blocked at the second assembly line end by the second assembly line blocking structure in the blocking configuration of the second assembly line blocking structure and is released in the releasing configuration of the second assembly line blocking structure.

15. The assembly system according to claim 14, wherein the first and second assembly line blocking structure are in each case arranged to be movable between their respective releasing configuration and blocking configuration by a linear movement.

16. The assembly system according to claim 14, wherein the first assembly line blocking structure is movable from the blocking configuration of the first assembly line blocking structure into the releasing configuration of the first assembly line blocking structure by the second shiftable end conveying module and wherein the second assembly line blocking structure is movable from the blocking configuration of the second assembly line blocking structure into the releasing configuration of the second assembly line blocking structure by the first shiftable end conveying module.

17. The assembly system according to claim 14, wherein the first and second assembly line blocking structure are in each case arranged to be movable into their respective blocking configuration by way of gravity.

18. The assembly system according to claim 12, the assembly system including a first conveying line shuttle stopper and a second conveying line shuttle stopper, wherein the first conveying line shuttle stopper includes a first conveying line blocking structure and the second conveying line shuttle stopper includes a second conveying line blocking structure, wherein the first conveying line blocking structure and the second conveying line blocking structure are each arranged movable between a respective releasing configuration and an alternative respective blocking configuration,
wherein a core conveying line shuttle conveying room of the core conveying line is blocked at the first core conveying line end by the first conveying line blocking structure in the blocking configuration of the first conveying line blocking structure and is released in the releasing configuration of the first conveying line blocking structure, and
wherein the core conveying line shuttle conveying room is blocked at the second core conveying line end by the second conveying line shuttle stopper in the blocking configuration of the second conveying line shuttle stopper and is released in the releasing configuration of the second conveying line shuttle stopper.

19. The assembly system according to claim 18, wherein the first and second conveying line blocking structure are in each case arranged to be movable between their respective releasing configuration and blocking configuration by a linear movement.

20. The assembly system according to claim 18, wherein the first conveying line blocking structure is movable from the releasing configuration of the first conveying line blocking structure into the blocking configuration of the first conveying line blocking structure by the first shiftable end conveying module and wherein the second conveying line blocking structure is movable from the releasing configuration of the second conveying line blocking structure into the blocking configuration of the second conveying line blocking structure by the second shiftable end conveying module.

21. The assembly system according to claim 18, wherein the first conveying line blocking structure is lockable with respect to the core conveying line and is lockable with respect to the first shiftable end conveying module, and wherein the second conveying line blocking structure is lockable with respect to the core conveying line and is lockable with respect to the second shiftable end conveying module.

22. A method for conveying a shuttle, the method including:
providing the shuttle with a magnetic member;
providing a circumferentially closed conveying belt, the conveying belt extending along a longitudinal conveying line axis, wherein the conveying belt includes a counter-magnetic member, the counter-magnetic member extending substantially along a whole circumference of the conveying belt and a magnetizable attraction bar extending parallel to the longitudinal conveying line axis;
releasably coupling the shuttle to the conveying belt via the counter-magnetic member interacting with the magnetic member and attraction between the magnetic member and the magnetizable attraction bar by way of ferromagnetic forces; and
driving the conveying belt with a circumferential speed.

23. A method for assembling a medical product, using an assembly system according to claim 12.

24. The assembly system according to claim 21, wherein the first conveying line blocking structure is magnetically lockable with respect to the core conveying line and is magnetically lockable with respect to the first shiftable end conveying module, and wherein the second conveying line blocking structure is magnetically lockable with respect to the core conveying line and is magnetically lockable with respect to the second shiftable end conveying module.

* * * * *